US 11,150,635 B2

(12) United States Patent
Middendorf et al.

(10) Patent No.: US 11,150,635 B2
(45) Date of Patent: Oct. 19, 2021

(54) PROJECTS WITHIN A PROCESS CONTROL ASSET MANAGEMENT SYSTEM

(71) Applicant: FISHER-ROSEMOUNT SYSTEMS, INC., Round Rock, TX (US)

(72) Inventors: Fred G. Middendorf, Eagan, MN (US); William F. L'Huillier, Eden Prairie, MN (US); Scott N. Hokeness, Lakeville, MN (US); Darren L. Halzle, Champlin, MN (US); Christian R. Butikofer, Eden Prairie, MN (US); Matthew D. Heiler, Minneapolis, MN (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 125 days.

(21) Appl. No.: 16/137,882

(22) Filed: Sep. 21, 2018

(65) Prior Publication Data
US 2019/0101898 A1 Apr. 4, 2019

Related U.S. Application Data

(60) Provisional application No. 62/566,792, filed on Oct. 2, 2017.

(51) Int. Cl.
*G05B 19/418* (2006.01)
*G06Q 10/06* (2012.01)

(52) U.S. Cl.
CPC ..... *G05B 19/4183* (2013.01); *G05B 19/4188* (2013.01); *G05B 19/41815* (2013.01); *G05B 19/41875* (2013.01); *G06Q 10/06313* (2013.01)

(58) Field of Classification Search
CPC .............. G06Q 10/06; G06Q 10/1097; G06Q 10/0631; G06Q 10/063114; G06Q 50/04;
(Continued)

(56) References Cited

U.S. PATENT DOCUMENTS 5,548,506 A * 8/1996 Srinivasan ..... G06Q 10/063114
705/7.15
5,761,063 A * 6/1998 Jannette ................. G06Q 10/06
700/97
(Continued)

FOREIGN PATENT DOCUMENTS

JP  2002-258936 A  9/2002
JP  2003-186529 A  7/2003
(Continued)

OTHER PUBLICATIONS

475 Field Communicator Product Data Sheet, Emerson Process Management, May 2013, available at: <www.fieldcommunicator.com>8 pages.
(Continued)

*Primary Examiner* — Scott L Jarrett
(74) *Attorney, Agent, or Firm* — Marshall, Gerstein & Borun LLP

(57) ABSTRACT

An asset management system used in a process control plant or other control system includes a database that stores asset data for each of a plurality of devices within the plant and a viewing system that accesses the asset data to provide statistical information to a user pertaining to the plant assets. The asset management system enables a user to define and store one or more projects within the plant and a set of plant assets associated with each of the projects. Thereafter, the asset management system performs statistical analyses on the assets within one or more of the defined projects and presents, to a user via a user interface, raw and statistical information pertaining to the assets within the project. The analysis engine may determine the device states or health statuses of the assets associated with the project and may present statistical and/or historical information regarding the number or percentage of assets within the project that are in a particular state or status. The system enables a user to use (Continued)

this information to determine the progress of or completion percentage of the entire project.

24 Claims, 13 Drawing Sheets

(58) Field of Classification Search
CPC .. G06Q 10/06311; G06Q 10/20; G06Q 10/10; G06Q 10/06313; G06Q 10/103; G05B 19/418
See application file for complete search history.

(56) References Cited

U.S. PATENT DOCUMENTS

| | | | |
|---|---|---|---|
| 5,796,602 A | 8/1998 | Wellan et al. | |
| 6,578,004 B1* | 6/2003 | Cimral | G06Q 10/06 705/7.39 |
| 6,957,206 B2 | 10/2005 | Nolan | |
| 7,174,339 B1* | 2/2007 | Wucherer | G06F 30/13 |
| 7,216,132 B1* | 5/2007 | Flam | G06Q 10/06 |
| 7,330,822 B1* | 2/2008 | Robson | G06Q 10/06 705/7.15 |
| 7,406,431 B2* | 7/2008 | Spira | G06Q 10/06393 705/7.21 |
| 7,519,539 B1* | 4/2009 | Fliess | G06Q 10/00 705/301 |
| 7,684,875 B2* | 3/2010 | Jundt | G05B 19/042 700/19 |
| 7,703,093 B2* | 4/2010 | Fischer | G05B 19/4185 717/177 |
| 7,761,591 B2 | 7/2010 | Graham | |
| 7,921,026 B2* | 4/2011 | O'Cull | G06Q 10/06312 705/7.23 |
| 7,996,774 B1* | 8/2011 | Sidenur | G06Q 10/10 715/743 |
| 8,050,953 B2* | 11/2011 | Motoyama | G06Q 10/06 705/7.13 |
| 8,407,078 B1* | 3/2013 | Caputo | G06Q 10/06 705/7.27 |
| 8,423,397 B2* | 4/2013 | Sitton | G06Q 10/04 705/7.28 |
| 8,509,926 B2 | 8/2013 | Blevins et al. | |
| 8,595,103 B1* | 11/2013 | Wargin | G06Q 10/06 705/35 |
| 8,645,092 B2* | 2/2014 | Manning | G05B 19/41875 702/84 |
| 8,738,414 B1* | 5/2014 | Nagar | G06Q 10/101 705/7.25 |
| 9,256,846 B2* | 2/2016 | Stluka | G06Q 10/06 |
| 9,489,641 B2* | 11/2016 | Brown | G06Q 10/00 |
| 9,712,385 B2* | 7/2017 | Taylor | H04L 67/34 |
| 9,829,865 B2* | 11/2017 | Kanbe | G05B 6/02 |
| 9,851,707 B2* | 12/2017 | Hokeness | G05B 19/0426 |
| 10,007,951 B2* | 6/2018 | Alonzo | G06Q 40/06 |
| 10,096,003 B2* | 10/2018 | Vahid | G06Q 10/20 |
| 10,423,927 B2* | 9/2019 | Hamilton | G06Q 10/06 |
| 10,460,268 B2* | 10/2019 | Tanaka | G05B 23/0267 |
| 10,664,776 B1* | 5/2020 | Fakhouri | G06Q 10/063114 |
| 2003/0004656 A1* | 1/2003 | Bjornson | G05B 23/0278 702/34 |
| 2003/0154199 A1* | 8/2003 | Thomas | G06F 16/00 |
| 2003/0222896 A1* | 12/2003 | Hagmann | G06Q 10/063112 715/700 |
| 2005/0123884 A1* | 6/2005 | Walls | G09B 5/00 434/118 |
| 2005/0268244 A1* | 12/2005 | Vignet | G06Q 10/06 715/760 |
| 2006/0010418 A1* | 1/2006 | Gupta | G06Q 10/06 717/101 |
| 2006/0036403 A1* | 2/2006 | Wegerich | G06K 9/00536 702/183 |
| 2006/0087402 A1* | 4/2006 | Manning | G05B 19/41875 340/3.1 |
| 2006/0092039 A1 | 5/2006 | Saito et al. | |
| 2006/0123388 A1* | 6/2006 | Choi | G06F 8/20 717/101 |
| 2006/0136871 A1* | 6/2006 | O'Connor | G06Q 10/06 717/113 |
| 2006/0179076 A1* | 8/2006 | Weber | G06Q 10/00 |
| 2006/0253492 A1* | 11/2006 | Omansky | G06Q 10/087 |
| 2007/0061698 A1* | 3/2007 | Megiddo | G06F 40/14 715/210 |
| 2007/0078540 A1* | 4/2007 | Bump | G05B 19/41845 700/90 |
| 2007/0132779 A1* | 6/2007 | Gilbert | G05B 19/41885 345/619 |
| 2007/0250368 A1* | 10/2007 | Outland | G06Q 10/06 705/80 |
| 2008/0034015 A1 | 2/2008 | Behnen et al. | |
| 2008/0046104 A1* | 2/2008 | Van Camp | G05B 23/0283 700/90 |
| 2008/0126168 A1 | 5/2008 | Carney et al. | |
| 2009/0158272 A1* | 6/2009 | El-Assir | G06F 8/71 717/177 |
| 2011/0029102 A1* | 2/2011 | Campney | G05B 17/02 700/83 |
| 2011/0191500 A1* | 8/2011 | Odayappan | G05B 19/0426 710/8 |
| 2012/0130907 A1* | 5/2012 | Thompson | G06Q 10/103 705/301 |
| 2013/0211547 A1* | 8/2013 | Buchdunger | G05B 19/0426 700/11 |
| 2014/0122144 A1* | 5/2014 | Cirpus | G06Q 10/06 705/7.14 |
| 2014/0212978 A1* | 7/2014 | Sharpe, Jr. | G05B 23/0272 436/6 |
| 2014/0266712 A1* | 9/2014 | Bobo | G06Q 10/08 340/539.26 |
| 2014/0278703 A1* | 9/2014 | Owens, Jr. | G06Q 10/06313 705/7.23 |
| 2015/0135117 A1 | 5/2015 | Rajappa et al. | |
| 2015/0160098 A1* | 6/2015 | Noda | G05B 23/024 702/35 |
| 2016/0071059 A1* | 3/2016 | Petering | G06Q 10/103 705/301 |
| 2016/0267412 A1* | 9/2016 | Reed | G06Q 10/063114 |
| 2017/0004449 A1* | 1/2017 | Hubbard | G06Q 10/103 |
| 2017/0104825 A1* | 4/2017 | Hilemon | G06Q 10/20 |
| 2017/0205795 A1 | 7/2017 | Penumatcha et al. | |
| 2017/0242935 A1* | 8/2017 | Wragg | G06F 16/904 |
| 2017/0323238 A1* | 11/2017 | Tanaka | F01K 13/003 |
| 2018/0268416 A1* | 9/2018 | Ponnusamy | G06Q 30/01 |
| 2019/0286098 A1* | 9/2019 | Weng | G05B 19/042 |
| 2020/0034443 A1* | 1/2020 | Kentley | G06F 16/284 |

FOREIGN PATENT DOCUMENTS

| | | |
|---|---|---|
| JP | 2005-531826 A | 10/2005 |
| JP | 2006-302229 A | 11/2006 |
| JP | 2008-192152 A | 8/2008 |
| JP | 2009-505232 A | 2/2009 |
| JP | 2009-518749 A | 5/2009 |
| JP | 2011-059873 A | 3/2011 |
| JP | 2011-203954 A | 10/2011 |
| JP | 2012-032899 A | 2/2012 |
| WO | WO-03/075206 A2 | 9/2003 |

OTHER PUBLICATIONS

AMS Suite—Improve Reliability and Performance, Emerson Process Management, 2013, available at: <www.assetweb.com>, 16 pages.

Chen, Deji, Mark Nixon, and Aloysius Mok. "Why WirelessHART." WirelessHARTTM. Springer US, 2010. pp. 195-199.

Decision on Rejection for Japanese Patent Application No. 2016-540377, dated Oct. 31, 2017, 9 pages including English translation.

EPO Communication for European Patent Application No. 14841731. 4, dated Mar. 16, 2017, 12 pages.

(56) References Cited

OTHER PUBLICATIONS

Fan, Jiyuan, and Stuart Borlase. "The evolution of distribution." IEEE Power and Energy magazine 7.2 (2009): pp. 63-68.
First Office Action for Chinese Patent Application No. 201480003931.5 dated Nov. 9, 2016, 27 pages.
International Search Report and Written Opinion for International Application No. PCT/US2014/054055, dated Dec. 17, 2014, Date of Filing: Sep. 4, 2014, 15 pages.
Office Action for Japanese Patent Application No. 2016-540377, dated Mar. 7, 2017, 7 pages with English translation.
Second Office Action for Chinese Patent Application No. 201480003931.5. dated Jul. 6, 2017, 27 pages including English translation.
Wollschlaeger, Martin, et al. "Integration of fieldbus systems into on-line asset management solutions based on fieldbus profile descriptions." Factory Communication Systems, 2002. 4th IEEE International Workshop on. IEEE, 2002. pp. 89-96.
Search Report for Application No. GB1815501.0, dated Mar. 20, 2019.

\* cited by examiner

FIG. 10

| AMSTag | Status | User Configuration | User Configuration Applied | Application Date | Issues |
|---|---|---|---|---|---|
| VT-202W | Complete | VT-UC-1 | Successful | 9/9/2017 | |
| VT-305W | Complete | VT-UC-1 | Successful | 9/10/2017 | |
| VT-101 | Complete | VT-UC-3 | Successful | 9/11/2017 | |
| FC-105_6200 | In Progress | FC-UC-4 | Successful | 9/12/2017 | |
| FC-105_6000 | In Progress | FC-UC-4 | Successful | 9/13/2017 | |
| FT-101 | Complete | FT-UC-7 | Failed | 9/14/2017 | User configuration not found |
| PT-401 | Complete | PT-UC-12 | Successful | 9/9/2017 | |
| PT-301 | Complete | PT-UC-12 | Successful | 9/9/2017 | |
| PT-501 | Complete | PT-UC-12 | Successful | 9/9/2017 | |
| PT-502 | Complete | PT-UC-12 | Successful | 9/9/2017 | |
| PT-601 | Complete | PT-UC-12 | Successful | 9/9/2017 | |
| PT-602 | Complete | PT-UC-12 | Failed | 9/9/2017 | Insufficient permission to access device |
| PT-604 | Complete | PT-UC-12 | Failed | 9/9/2017 | Insufficient permission to access device |
| LT-901 | Not Started | LT-UC-12 | Successful | 9/9/2017 | |
| PT-503 | Not Started | PT-UC-12 | Mapped | 9/9/2017 | |
| PT-504 | Not Started | PT-UC-12 | Mapped | 9/9/2017 | |
| PT-701 | Not Started | PT-UC-12 | Mapped | 9/9/2017 | |
| PT-702 | Not Started | PT-UC-12 | Mapped | 9/9/2017 | |
| PT-703 | Not Started | PT-UC-12 | Mapped | 9/10/2017 | |
| PT-704 | In Progress | PT-UC-12 | Successful | 9/11/2017 | |
| PT-705 | In Progress | PT-UC-12 | Successful | 9/12/2017 | |
| PT-3051-H7 | In Progress | PT-UC-12 | Successful | 9/13/2017 | |
| PT-201 | In Progress | PT-UC-12 | Successful | 9/7/2017 | |
| TT-101 | Complete | TT-UC-3 | Successful | 9/8/2017 | |
| TT-401 | Complete | TT-UC-4 | Successful | 9/9/2017 | |
| PT-205 | Complete | PT-UC-12 | Successful | 9/10/2017 | |
| TT-202 | Complete | TT-UC-4 | Successful | 9/11/2017 | |
| LT-401 | Complete | LT-UC-12 | Successful | 9/12/2017 | |
| LT-101 | Complete | LT-UC-12 | Successful | 9/13/2017 | |
| TT-302W | Complete | TT-UC-12 | Successful | 9/9/2017 | |
| TT-304W | Complete | TT-UC-12 | Successful | 9/9/2017 | |
| AT-101 | Complete | AT-UC-12 | Successful | 9/9/2017 | |
| TT-105 | Complete | TT-UC-12 | Successful | 9/9/2017 | |
| TT-303W | Complete | TT-UC-12 | Successful | 9/9/2017 | |
| FT-401 | Complete | FT-UC-12 | Successful | 9/9/2017 | |
| 8800D | Complete | 8800D-UC-12 | Successful | 9/9/2017 | |
| PAM-GW1 | Complete | PAM-UC-12 | Successful | 9/9/2017 | |
| WIOC-1F9188 | Complete | WIOC-UC-12 | Successful | 9/9/2017 | |
| WPG-101 | Complete | WPG-UC-12 | Successful | 9/9/2017 | |
| PHT-304W | Complete | PHT-UC-12 | Successful | 9/9/2017 | |

FIG. 13

PROJECTS WITHIN A PROCESS CONTROL ASSET MANAGEMENT SYSTEM

CROSS REFERENCE TO RELATED APPLICATIONS

This application claims priority to U.S. Provisional Patent Application Ser. No. 62/566,792, entitled "Projects Within a Process Control Asset Management System," which was filed Oct. 2, 2017, which is related to U.S. patent application Ser. No. 14/477,266, entitled "Bulk Field Device Operations" and filed Sep. 4, 2014, the entire disclosures of which are hereby expressly incorporated by reference herein.

TECHNICAL FIELD

The present disclosure relates generally to process plants and process control systems, and more particularly, to determining and assessing a status of a particular set of process control devices within a process plant.

BACKGROUND

Distributed process control systems, like those used in chemical, petroleum, industrial or other process plants to manufacture, refine, transform, generate, or produce physical materials or products typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process and/or environmental parameters such as temperature or pressure, etc. to control one or more processes executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system, e.g., to control at least a portion of one or more industrial processes running or executing within the plant or system. I/O devices, which are also typically located within the plant environment, are generally disposed between a controller and one or more field devices, and enable communications there-between, e.g., by converting electrical signals into digital values and vice versa, by converting between different communication protocols, etc.

Information from the field devices and the controller is usually made available over a data highway or communication network to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers and, in some cases, smart field devices. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controllers via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Many process plants include or have installed therein an asset management system that tracks or collects data regarding the various assets of the plant, including for example, field devices (such as sensors, transmitters, valves, etc.), controllers, input/output (I/O) devices, servers, communication networks, user interfaces, databases, handheld devices, etc. The information about the devices or assets may be stored in one or more asset management databases in the plant or in databases, e.g., cloud based databases, associated with the plant, and this data may be used to provide raw and statistical information about the devices in the plant, such as the status of various devices, the health of various devices, maintenance data about the devices, such as the last calibration date, scheduled maintenance, etc. for the device, as well as various other device related information. These current asset management systems typically store and provide data for all of the devices or assets in a plant or a group of plants (e.g., an enterprise system) and enable the user to view statistical information about the entire set of devices in the plant or system, such as the number or percentage of devices needing maintenance, having health or other status issues, etc. As a result, these asset management systems are very good at providing an overview of a plant (from a maintenance perspective) when the plant is up and running normally.

However, in many cases, process plants may experience situations in which some, but not all of the plant assets, such as field devices, are not being run or operated in a normal operational mode. More particularly, in a process control plant, there are times during the running operation where a user will know when the plant or a portion of the plant will be down for a period of time. During this time, the user may not want to be bothered with the alarms and alerts that are coming from their smart field device instrumentation associated with the "down" devices that may defer their attention from the more important devices that are still currently running the plant. Also when a new part of a plant is coming on-line or is being commissioned for the first time, the user may want to know about the alerts that their field devices have but do not necessarily want to deal with these alerts in the same priority or fashion that they deal with a field device that is operating in a run-time mode to control the process.

For example, the plant may be under an expansion initiative in which new devices are being installed and commissioned in the plant, a section (such as a process line, a room, a particular area, etc.) of the plant may be undergoing a maintenance activity that requires taking all of those devices off-line at the same time, etc. Thus, generally speaking, any group of devices may be involved in one or more projects being implemented in the plant which remove these devices from the run-time system for the duration of the project. Such projects may be maintenance projects, expansion projects, upgrade projects, retrofitting projects, commissioning projects, or any other types of projects.

Generally, during a plant expansion or upgrade, new devices are added to the plant to provide the plant with new or additional capabilities. In many cases, these activities include commissioning of the new devices or assets in process plant or system, which involves bringing various components of the plant or system to the point where the system or plant can operate as intended. Commissioning is an involved and complex process. For example, commissioning may include actions or activities such as confirming an identity of an installed process control device (such as a field device) and its connections, determining and providing tags that uniquely identify the process control device within the process control system or plant, setting or configuring initial values of parameters, limits, etc., verifying the correctness of a device installation by manipulating signals provided to the devices, and generating as-built I/O lists to indicate the actual physical connections of the device implemented within the plant, to name a few. For some commissioning tasks, a user may utilize a commissioning tool (e.g., a handheld or portable computing device) locally at a target process control device or loop. Some commissioning tasks may be performed at an operator interface of the process control system, e.g., at an operator interface of an operator workstation included in a back-end environment of the process plant.

Typically, the commissioning of a process plant requires physical devices, connections, wiring, etc. to be installed, set up, and inter-connected in the field environment of the process plant. At the back-end environment of the plant (e.g., at the centralized administrative computing devices such as operator workstations, personal computers or computing devices, centralized databases, configuration tools, etc. that are typically placed in control rooms or other locations away from the harsher field environment of the plant), data that specifically identifies and/or addresses the various devices, their configurations, and their interconnections is integrated, verified or commissioned, and stored. As such, after the physical hardware has been installed and configured, identification information, logical instructions, and other instructions and/or data is downloaded or otherwise provided to the various devices disposed in the field environment so that the various devices are able to communicate with other devices. This process is referred to as configuring the devices.

Typically, components of a process plant are commissioned according to a set of desired parameters or specifications, which may be specified by one or more documents and/or tools developed by commissioning personnel. The components are commissioned using system interfaces and utilities that are also used for other management functions within the process plant, including system configuration, maintenance, and managing activities, during process plant operation. However, commissioning personnel are often limited to use of the system interfaces and utilities, which results in works delays, conflicts, and errors, and often results in commissioning personnel implementing their own tools and utilities that are limited and have no interaction with the control system and field devices. These processes are time consuming, are prone to inconsistencies and mistakes, and do not enable an efficient and effective determination of whether field devices are properly commissioned.

Similarly, large maintenance projects, such as the periodic cleaning of a set of refinery equipment, may require some or even many, but not all of the devices of the plant to be taken off-line and/or reconfigured, calibrated, repacked (e.g., valves) or otherwise maintained in some manner in accordance with the specifics of the particular project. Of course, other types of projects may involve other sets of devices or assets within a plant.

As will be understood, when devices or other plant assets are involved in a project, such as a commissioning or a maintenance project, these devices may be in various stages or states of configuration or operation that indicate that the device is not fully functional. Because asset management systems are typically limited to tracking all of the devices within the plant and providing statistics based on all of the devices tracked, these systems provide confusing or imperfect statistical data about the health or operational state of the plant as a whole when one or more commissioning, upgrade, maintenance, or other projects is ongoing, making it difficult for a user to access and to understand the true state of the part of the plant that is supposed to be operating normally. Thus, for example, when a group of devices is going through a commissioning project or a maintenance project, these devices are typically in a state that indicates that they are not fully operational, or that they are not as healthy as desired (with respect to a runtime device). The asset management system, however, has no ability to limit the statistical analysis being performed to devices that are not associated with the project or projects and thus presents statistical data including devices that are involved in run-time activities and devices that are involved in projects in which the devices are not expected to be in run-time operations. This situation leads to inaccurate or misleading statistical information about the operational state of the plant. Moreover, the current asset management systems have no ability to determine or provide any statistical analysis regarding the progress or progression of a particular maintenance or commissioning project, because the asset management system does not know which devices are involved in any particular commissioning or maintenance project.

SUMMARY

An asset management system used in a process control plant or other control system includes a database that stores asset data for each of a plurality of assets, e.g., devices, within the plant and a viewing system or application that accesses the asset data to provide raw and statistical information to a user pertaining to the plant assets. The asset management system enables a user to define one or more projects within the plant or enterprise environment, wherein each project includes a set of assets or devices, and to store these projects and the devices associated therewith within the asset database. Thereafter, the asset management system may perform a statistical analysis on the assets within one of the projects and present, to a user, via a user interface for example, raw and statistical information pertaining to the assets within the project. The asset management system may, for example, determine the states or statuses of the assets associated with the project and present statistical information regarding the number or percentage of assets within the project that are in a particular state or status. For example, the asset management system may determine if each of the devices or assets associated with a commissioning project are in either a commissioned or a non-commissioned state and may present a screen indicating the number and/or percentage of each of the devices associated with the project that are in each state. The system enables a user to use this information to determine the progress or completion percentage of the entire project. In another example, the asset management system may determine and present statistical information regarding the health of each of the devices within a particular project to enable a user to determine the overall health of the devices associated with the project, again to enable the user to determine the work that is completed or that still needs to be completed on the project.

Still further, the asset management system may determine statistical information regarding the state and/or health of plant assets that are not within a particular project or that are not within any defined project, and may present various statistical information to a user via, for example, a user interface, indicating various statistical information about the plant assets that are not associated with any projects. This system thereby enables a user to view or determine the run-time state or health of the portions of the plant that are in a run-time condition (or that are expected to be in a run-time condition) in the form of statistical information collected only for plant assets that are not within any project. This system prevents the user from getting a false impression of the overall state of the run-time plant condition presented by systems that do not exclude devices or assets within the plant that are not expected to be in run-time condition, such as devices involved in an upgrade, expansion, or maintenance project.

Likewise, the asset management system stores historical data pertaining to the various asset or device states and health states of assets within a project at different times associated with or over the life of the project, and the asset management system may provide a user with information, such as a graph, indicating the statistical changes or transitions in device states or device health over various time periods. This information may be stored for a completed project and may be used on future projects (such as projects of a similar nature and/or size) to enable a user to determine the time it is expected to take to complete a new or proposed project, to view the time trends of a project with respect to device states or health states over the course of a project to thereby enable a user to determine if a new or similar project is on track or is being completed as expected.

Likewise, the asset management system may include a report generator that may generate one or more reports for a project, such as a commissioning report for a commissioning project or other project in which assets must be commissioned. The commissioning report may include information regarding the number of devices within the project that are in various different commissioning states (or to which various different commissioning activities associated with commissioning the device need to be performed). Again, such a report can be used to provide or direct further commissioning activities to be performed on a commissioning project as the report may list the various devices in various commissioning states, the number of devices that have had various commissioning activities performed thereon, etc.

BRIEF DESCRIPTION OF THE DRAWINGS

FIG. 10 illustrates an example user interface that may be produced by an asset management system to depict additional information regarding the assets within a further configuration or commissioning device state as illustrated in the screen of FIG. 7.

FIG. 13 illustrates an example commissioning report that may be created by an asset management system to indicate a state or status of a commissioning project, including activities to be performed to complete the project.

DETAILED DESCRIPTION

Figure 1:
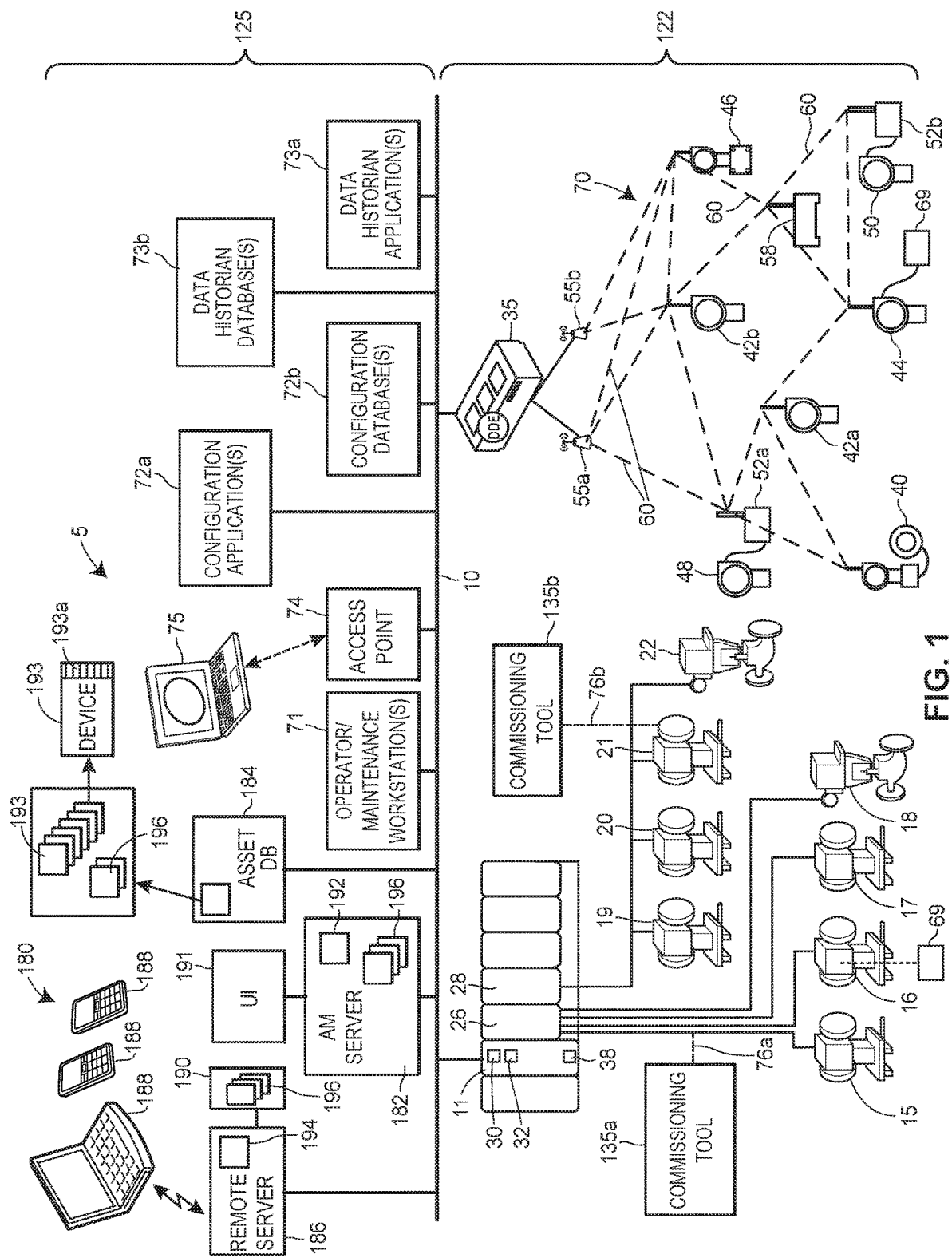
FIG. 1 depicts a block diagram of an example process plant and components thereof, and an asset management system disposed within the process plant that collects asset data and provides statistical information pertaining to a set of devices assets associated with one or more projects within the plant.

FIG. 1 depicts a block diagram of an example process plant, process control system, or process control environment 5 in which an asset management system that performs activities based on project definitions within the plant 5 is located. Generally speaking, the process plant 5 includes one or more process controllers that, during run-time, may receive signals indicative of process measurements made by field devices, process this information to implement a control routine, and generate control signals that are sent over wired or wireless process control communication links or networks to the same or other field devices to control the operation of a process in the plant 5. Typically, at least one field device performs a physical function (e.g., opening or closing a valve, increasing or decreasing a temperature, etc.) to control the operation of a process, and some types of field devices communicate with controllers using I/O devices. Process controllers, field devices, and I/O devices may be wired or wireless, and any number and combination of wired and wireless process controllers, field devices and I/O devices may be included in the process plant environment or system 5.

For example, the process plant 5 depicted in FIG. 1 includes a process controller 11 that is communicatively connected to wired field devices 15-22 via input/output (I/O) cards 26 and 28, and that is communicatively connected to wireless field devices 40-46 via a wireless gateway 35 and a process control data highway or backbone 10 (which may include one or more wired and/or wireless communication links, and may be implemented using any desired or suitable or communication protocol such as, for example, an Ethernet protocol). In some cases, the controller 11 may be communicatively connected to the wireless gateway 35 using one or more communications networks other than the backbone 10, such as by using any number of other wired or wireless communication links that support one or more communication protocols, e.g., Wi-Fi or other IEEE 802.11 compliant wireless local area network protocol, mobile communication protocol (e.g., WiMAX, LTE, or other ITU-R compatible protocol), Bluetooth®, HART®, WirelessHART®, Profibus, FOUNDATION® Fieldbus, etc.

The controller 11, which may be, by way of example, the DeltaV™ controller sold by Emerson Process Management, may operate to implement a batch process or a continuous process using at least some of the field devices 15-22 and 40-46. Moreover, in addition to being communicatively connected to the process control data highway 10, the controller 11 is also communicatively connected to at least some of the field devices 15-22 and 40-46 using any desired hardware and software associated with, for example, standard 4-20 mA devices, I/O cards 26, 28, and/or any smart communication protocol such as the FOUNDATION® Fieldbus protocol, the HART® protocol, the WirelessHART® protocol, the CAN protocol, the Profibus protocol, etc. In FIG. 1, the controller 11, the field devices 15-22 and the I/O cards 26, 28 are wired devices, and the field devices 40-46 are wireless field devices. Of course, the wired field devices 15-22 and wireless field devices 40-46 could conform to any other desired standard(s) or protocols, such as any wired or wireless protocols, including any standards or protocols developed in the future.

The process controller 11 of FIG. 1 includes a processor 30 that implements or oversees one or more process control routines 38 (e.g., that are stored in a memory 32). The processor 30 is configured to communicate with the field devices 15-22 and 40-46 and with other process control devices communicatively connected to the controller 11. It should be noted that any control routines or modules described herein may have parts thereof implemented or executed by different controllers or other devices if so desired. Likewise, the control routines or modules 38 described herein which are to be implemented within the process control system 5 may take any form, including software, firmware, hardware, etc. Control routines may be implemented in any desired software format, such as using object oriented programming, ladder logic, sequential function charts, function block diagrams, or using any other software programming language or design paradigm. The control routines 38 may be stored in any desired type of memory 32, such as random access memory (RAM), or read only memory (ROM). Likewise, the control routines 38 may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

In some cases, the controller 11 may implement a control strategy using what are commonly referred to as function blocks, where each function block is an object or other part (e.g., a subroutine) of an overall control routine and operates in conjunction with other function blocks (via communications called links) to implement process control loops within the process control system 5. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 5. Of course, hybrid and other types of function blocks exist. Function blocks may be stored in and executed by the controller 11, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. The controller 11 may include one or more control routines 38 that may implement one or more control loops that may be performed by executing one or more of the function blocks.

The wired field devices 15-22 may be any types of devices, such as sensors, valves, transmitters, positioners, etc., while the I/O cards 26 and 28 may be any types of I/O devices conforming to any desired communication or controller protocol. In FIG. 1, the field devices 15-18 are standard 4-20 mA devices or HART® devices that communicate over analog lines or combined analog and digital lines to the I/O card 26 (also referred to herein as "non-smart" or "dumb" devices), while the field devices 19-22 are smart devices, such as FOUNDATION® Fieldbus field devices, that communicate over a digital bus to the I/O card 28 using a FOUNDATION® Fieldbus communications protocol. In some embodiments, though, at least some of the wired field devices 15, 16 and 18-21 and/or at least some of the I/O cards 26, 28 additionally or alternatively communicate with the controller 11 using the process control data highway 10 and/or by using other suitable control system protocols (e.g., Profibus, DeviceNet, Foundation Fieldbus, ControlNet, Modbus, HART, etc.).

In the example process plant 5 of FIG. 1, the wireless field devices 40-46 communicate via a wireless process control communication network 70 using a wireless protocol, such as the WirelessHART® protocol. Such wireless field devices 40-46 may directly communicate with one or more other devices or nodes of the wireless network 70 that are also configured to communicate wirelessly (using the wireless protocol or another wireless protocol, for example). To communicate with one or more other nodes that are not configured to communicate wirelessly, the wireless field devices 40-46 may utilize a wireless gateway 35 connected to the process control data highway 10 or to another process control communications network. The wireless gateway 35 provides access to various wireless devices 40-58 of the wireless communications network 70. In particular, the wireless gateway 35 provides communicative coupling between the wireless devices 40-58, the wired devices 11-28, and/or other nodes or devices of the process control plant 5. For example, the wireless gateway 35 may provide communicative coupling by using the process control data highway 10 and/or by using one or more other communications networks of the process plant 5.

Similar to the wired field devices 15-22, the wireless field devices 40-46 of the wireless network 70 perform physical control functions within the process plant 5, e.g., opening or closing valves, or taking measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some configurations of the process plant 5, the wireless network 70 includes non-wireless devices. For example, in FIG. 1, a field device 48 is a legacy 4-20 mA device and a field device 50 is a wired HART® device. To communicate within the network 70, the field devices 48 and 50 are connected to the wireless communications network 70 via a wireless adaptor 52a, 52b. The wireless adaptors 52a, 52b support a wireless protocol, such as WirelessHART, and may also support one or more other communication protocols such as Foundation® Fieldbus, Profibus, DeviceNet, etc. Additionally, in some configurations, the wireless network 70 includes one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communications network 70. In FIG. 1, the wireless devices 40-46 and 52-58 communicate with each other and with the wireless gateway 35 over wireless links 60 of the wireless communications network 70, and/or via the process control data highway 10. Moreover, in some cases, a handheld communication device 69 may be used to communicate with one or more of the field devices 15-22, 40-58 or other devices (e.g., gateways 35, controllers 11, I/O devices 26, 28, etc.) directly to thereby enable a maintenance person or other user to communicate with, alter the configuration of, and commission the device directly. The handheld device 69 may communicate with the other process plant assets directly, through a direct wired or wireless communication link temporarily established between the installed plant device and the handheld device 69, or the handheld device 69 may communicate with a plant asset via an access point on a network or other communication link established as part of the permanent or run-time plant communication network. The user may use the handheld device 69 to perform some activity on a field device or other plant asset, may store information such as device information about this activity, and may later download that information to one or more databases, such as a configuration database or an asset management database discussed below.

As illustrated in FIG. 1, the process control system 5 also includes one or more operator and/or maintenance workstations 71 that are communicatively connected to the data highway. Using the operator and maintenance workstations 71, operators or maintenance personnel may view and monitor real-time operations of the process plant 5, as well as take any diagnostic, corrective, maintenance, and/or other actions that may be required. Generally speaking, operators take actions to change the ongoing operation of the plant during run-time to thereby cause the plant control system to work better. On the other hand, maintenance personnel generally view data pertaining to the operational states or statuses of various devices in the plant and take actions to maintain, repair, calibrate, etc. the devices to assure that the devices are operating in a manner that enables the control system to perform satisfactorily. At least some of the operator and maintenance workstations 71 may be located at various, protected areas in or near the plant 5, and in some situations, at least some of the operator and maintenance workstations 71 may be remotely located, but nonetheless be in communicative connection with the plant 5. The operator and maintenance workstations 71 may be wired or wireless computing devices.

The example process control system 5 is further illustrated as including a configuration application 72a and configuration database 72b, each of which is also communicatively connected to the data highway 10. Various instances of the configuration application 72a may execute on one or more computing devices (not shown) to enable users to create or change process control modules and download these modules via the data highway 10 to the controllers 11, as well as enable users to create or change operator interfaces via which an operator is able to view data and change data settings within process control routines. The configuration database 72b stores the created (e.g., configured) modules and/or operator interfaces. Additionally, the configuration database 72b stores a set of defined or baseline commissioning parameters associated with any of the field devices 15-22, 40-46. Generally, the configuration application 72a and configuration database 72b are centralized and have a unitary logical appearance to the process control system 5, although multiple instances of the configuration application 72a may execute simultaneously within the process control system 5, and the configuration database 72b may be implemented across multiple physical data storage devices. Accordingly, the configuration application 72a, the configuration database 72b, and the user interfaces thereto (not shown) comprise a configuration or development system 72 for control and/or display modules. Typically, but not necessarily, the user interfaces for the configuration system 72 are different than the operator and/or maintenance workstations 71, as the user interfaces for the configuration system 72 are utilized by configuration and development engineers irrespective of whether or not the plant 5 is operating in real-time, whereas the operator and maintenance workstations 71 are typically utilized by operators during real-time operations of the process plant 5.

The example process control system 5 also includes a data historian application 73a and a data historian database 73b, each of which is also communicatively connected to the data highway 10. The data historian application 73a operates to collect some or all of the data provided across the data highway 10, and to historize or store the data in the historian database 73b for long term storage. Similar to the configuration application 72a and the configuration database 72b, the data historian application 73a and the historian database 73b are typically centralized and have a unitary logical appearance to the process control system 5, although multiple instances of a data historian application 73a may execute simultaneously within the process control system 5, and the data historian database 73b may be implemented across multiple physical data storage devices.

In some configurations, the process control system 5 includes one or more other wireless access points 74 that communicate with other devices using other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as NFC and Bluetooth, or other wireless communication protocols. Typically, such wireless access points 74 allow handheld or other portable computing devices (e.g., user interface devices 75) to communicate over a respective wireless process control communication network that is different from the wireless network 70 and that supports a different wireless protocol than the wireless network 70. For example, a wireless or portable user interface device 75 may be a mobile workstation or may be diagnostic test equipment that is utilized by an operator or maintenance person within the process plant 5 (e.g., an instance of one of the operator or maintenance workstations 71). In some scenarios, in addition to portable computing devices, one or more process control devices (e.g., the controller 11, the field devices 15-22, the I/O devices 26, 28, or the wireless devices 35, 40-58) also communicate using the wireless protocol supported by the access points 74.

The example process control system 5 may also include one or more commissioning tools 135a, 135b that are used in field environment 122 for commissioning process control devices of the process plant 5. The commissioning tool 135a, 135b may be a portable computing device, such as a laptop computer, a tablet or handheld smart device, a wearable computing device, etc. The commissioning tool 135a may be used to commission the non-smart field devices 15-18, the smart field devices 19-22, and/or other devices disposed in the field environment 122 of the process plant 5. To commission the non-smart field devices 15-18, the commissioning tool 135a may communicate over a wireless link 76a (e.g., via RFID, NFC, etc.) with the I/O card 26 or any other suitable component that is connected to the non-smart field devices 15-18. In this manner, the commissioning tool 135a may transfer commissioning data (e.g., device tags) for the non-smart field devices 15-18 to the corresponding I/O card 26 or an electronic marshaling component electrically connected to the I/O card 26. To commission the smart field devices 19-22, the commissioning tool 135b may communicate over a wireless link 76b directly with the smart field devices 19-22. In this manner, the commissioning tool 135b may transfer commissioning data (e.g., device tags) directly to the smart field devices 19-22.

In some embodiments, the process control devices may be pre-configured, e.g., while at the factory and, as such, store default commissioning data before being installed or commissioned. In other embodiments, the process control devices may arrive from the factory without any commissioning data stored therein. For example, when an I/O device is communicatively connected to a non-smart field device, the I/O device does not store commissioning data for the non-smart field device until the commissioning tool 135 transfers the commissioning data to the I/O device.

It is noted that although FIG. 1 only illustrates a single controller 11 with a finite number of field devices 15-22 and 40-46, wireless gateways 35, wireless adaptors 52, access points 74, routers 58, and wireless process control communications networks 70 included in the example process plant 5, this is only an illustrative and non-limiting embodiment. Any number of controllers 11 may be included in the process control plant or system 5, and any of the controllers 11 may communicate with any number of wired or wireless devices and networks 15-22, 40-46, 35, 52, 55, 58 and 70 to control a process in the plant 5.

Further, it is noted that the process plant or control system 5 of FIG. 1 includes a field environment 122 (e.g., "the process plant floor 122") and a back-end environment 125 which are communicatively connected by the data highway 10. As shown in FIG. 1, the field environment 122 includes physical components (e.g., process control devices, networks, network elements, etc.) that are disposed, installed, and interconnected therein to operate to control the process during run-time. For example, the controller 11, the I/O cards 26, 28, the field devices 15-22, and other devices and network components 40-46, 35, 52, 55, 58 and 70 are located, disposed, or otherwise included in the field environment 122 of the process plant 5. Generally speaking, in the field environment 122 of the process plant 5, raw materials are received and processed using the physical components disposed therein to generate one or more products.

The back-end environment 125 of the process plant 5 includes various components such as computing devices, operator workstations, databases or databanks, etc., that are shielded and/or protected from the harsh conditions and materials of the field environment 122. Referring to FIG. 1, the back-end environment 125 includes, for example, the operator and maintenance workstations 71, the configuration or development systems 72 for control modules and other executable modules, data historian systems 73, and/or other centralized administrative systems, computing devices, and/or functionality that support the run-time operations of the process plant 5. In some configurations, various computing devices, databases, and other components and equipment included in the back-end environment 125 of the process plant 5 may be physically located at different physical locations, some of which may be local to the process plant 5, and some of which may be remote.

As discussed herein, the configuration database(s) 72b may be disposed in the back-end environment 125 of the process plant 5, and may be used for commissioning purposes. The configuration database(s) 72b may store, among other things, data and other information that specifically identifies and/or addresses the various devices or components and their interconnections that are planned for or desired to be implemented on the process plant floor or field environment 122. Some of this commissioning data may be provided to components in the field environment 122 for use in commissioning of devices and loops therein, and some of this data may be utilized in the back-end environment 125, e.g., for the design, development, and preparation of control modules and/or operator interface modules that will operate in conjunction with the field environment 122 during live operations of the process plant 5.

Still further, as illustrated in FIG. 1, an asset maintenance system 180 provides various information to one or more users, such as maintenance personnel, via for example, one or more of the maintenance interfaces 71 or other dedicated interfaces regarding the status or state of various ones of the field devices, controllers, I/O devices, or other assets within the front-end or field environment 122 of the plant 5. More particularly, the asset management system 180 may include a dedicated asset management computer or server 182, one or more asset management databases 184, one or more remote asset management servers 186 which communicate with the asset management device 182 via the communication link 10 to send data to and receive data from remote asset management user interface devices 188 (which may be thin-client devices with respect to the remote server 186, if so desired). The remote asset management server or servers 186 may also include asset management databases 190 which may store project data as described in more detail herein.

In one case, the asset management server 182, which includes a memory and a computer processor that implements programming or program modules thereon to access the asset management database 184 to obtain information stored in the database 184 regarding the status and health of devices or assets in the plant 5. As illustrated in FIG. 1, the asset management device 182 may store and execute a device manager software routine 192 which may interface with user interface 191 connected to the device 182 or with one or the maintenance workstations 71, or with other user interfaces, and which operates to access data pertaining the assets (i.e., devices) within the plant 5 as stored within the asset database 184. The device manager routine 192 may enable the user to view device data about various devices or assets in the plant 5, to make changes to the devices or assets in the plant 5 by sending and receiving messages to the devices via the network 10 and the controllers 11 or gateways 35, etc. In some cases, the device manager application 192 may access device parameters within the devices of the plant 5, may change parameters, may access information stored in the devices, may configure the devices, may calibrate the devices, etc. The device manager routine or application 192 may perform these activities in response to user input via, for example, the user interface 191, or may do so automatically, periodically, or at some scheduled times or rates. The device manager routine or application 192 may also store device data from the devices or pertaining to the devices in the plant 5 in the database 184 for later access and use. In particular, the database 184 may store separate device files 193 (e.g., one for each device in the plant) which contain current data about the devices, including device names, tags, manufactures, locations, calibration data, health data, communication connections or paths, etc. The device files 193 may including other information or device parameters including one or more project parameters 193a to be described in more detail herein. Of course, the device files or device information 193 may be stored in other databases as well or instead, including, for example, the configuration database 72b, the historian database 73b, etc.

Moreover, a device viewing application 194 may be executed within the server 182 or, as illustrated in FIG. 1, within the remote asset management server 186 (which likewise includes a memory and a computer processor for storing and executing the application 194) to access and call the asset management device manager software 192 to, in turn, obtain information from the asset database 184 pertaining to various devices or plant assets. The device viewer application 194 may provide data and statistics about various ones or groups of the devices or assets in the plant 5 in any of the manners described below and may communicate with the thin client devices 188 (or with an attached user interface device not shown in FIG. 1), with the operator/maintenance workstations 71 or computers 75 connected via an access point 74, or with any other user interface device to provide raw and statistical asset information and device information to a user.

In particular, according to one example, the device viewing application 194 may enable a user to create one or more projects 196, with each project including a listing a set of plant devices or assets associated with plant environment 122 of FIG. 1, as well as other information such as a project name, description, duration, location, etc. The projects definitions 196 (e.g., the list of devices associated with each project, as well as general project information, may be stored in the memory of the remote server device 186, in the remote server database 190, in the asset management device 182, in the asset management database 184 or in any other devices or combination of devices. Generally speaking, the device viewing application 194 may enable a user (e.g., via one of the thin client devices 188) to create a project by providing a name and other information regarding the project, and by selecting devices or plant assets to be associated with the project. The application 194 may then store the project list or project data in a database or memory as discussed above. Thereafter, a user may access statistical or other device information collected from or about the devices within a particular project in a manner that is separated from and that does not include information pertaining to devices or plant assets not in the project. Moreover, the user may additionally access statistical or other device information collected from or about run-time devices that are not associated with and that do not fall within any defined project in a manner that is separated from and that does not include information pertaining to devices or plant assets within the projects, so as to have the statistical information about run-time devices that is not being intermixed with and corrupted or tainted by device information about devices within a project (which are not expected to be in a run-time mode or condition).

With the definitions of the projects, the device viewing application 194 may provide very detailed information, including device and statistical information, to a user to enable the user to view or understand the current state of a project because the user can view device state and health information and statistical information compiled about device state and/or device health for only the devices within or associated with a particular project. Still further, the device viewing application 194 can compile and store device statistical information about all of the devices within a project over time to enable a user to view how the states and/or health statuses or other statistical information changed over the life of a project, e.g., using various graphs and charts, lists, etc. At the end of a project, the device viewing application 194 can enable a user to specify that the project is complete, and may store the historical data for a project in, for example, the database 184.

Thereafter, a user may view historical data for a project in an attempt to compare the change of states and health information of devices over time to a new or current project to thereby track the progress of the new project as compared to a previously completed project, or to estimate the length of time it will take to complete the new project. Still further, the device viewing application 194, or another application, such as a commissioning application (not shown) may use the project list to access device data about devices in a project, and may prepare and provide a report on the project (such as the current state of the project, a projected finish date for the project, a completion percentage of the project, or other information) based on the device data about the devices only within the project. In the past such reports, e.g., commissioning reports, were not easy to produce because the commissioning software had no way of knowing what devices were in a project.

As noted above, the defined projects may be commissioning projects, maintenance projects, or any other projects that require particular activities to be taken to or made on or to a group of devices or assets in a plant. Generally speaking, each project defines or includes devices that are removed from or that or not yet added to the run-time system or operation during the life of the project. Projects can thus define or include devices already installed in the plant (which may or may not be commissioned), devices being installed or added to the plant but not yet in the run-time operation or condition (e.g., not yet commissioned), and virtual devices which are not yet physically at the plant but are intended or planned to be installed in the plant at some point in the future, and thus devices which are not installed or commissioned in the plant.

Thus, the user interface and data storage capabilities of the device viewer and device manager applications 194, 192 provide the ability to create a group of devices defined by device tags which are planned to undergo a specific process together. This group can be independent of location, type of device, or other commonly available methods for filtering device lists based upon physical characteristics or control parameters of devices. Moreover, the applications 192, 194 have the ability to add or remove devices to/from the project after the project has been created, to rename the project after the project has been created while still maintaining the original group along with any additions or removals tied to previous project name(s), to maintain a history of each device included in the project or removed from the project for later auditing of the events related to the participation of devices within a project, and to notify a user of conditions of interest related to devices in the project prior to completing the project. If desired, the project could be created and stored entirely within a thin client version of the device manager and/or device viewer applications 192, 194.

Moreover, as noted above, there are times during the running operation of a plant where a user, such as a maintenance person, an operator, etc., will know when the plant or a portion of the plant will be down for a period of time. During this time, the user does not want to be bothered with the alerts that are coming from their smart field device instrumentation associated with the non-operating part of the plant, because these alerts may deter their attention from the more important smart field devices that are still currently running in a run-time mode in the plant. Also, when a new part of a plant is coming on-line or is being commissioned for the first time, the end user may want to know about the alerts that these field devices have but does not necessarily want to deal with the alerts in the same priority or fashion that they would with a field device that is actively controlling the process during run-time. With the use of the project breakout, as discussed herein, the device manager application 192 and the device viewer application 194 operate to allow the user to define what field devices or other assets will be part of the commissioning or plant turn around project and group these devices separately from the devices in the rest of the running plant. During the time that a device is part of an active project, all of the device alerts and health information is removed from or separated from the information collected and generated (both raw data and statistical data based on the raw data) about the overall health of the plant, the plant alerts etc. Importantly, the health and device data for devices in a project is grouped together under that project to show the overall health and alerts for all of the devices in a given project. Moreover, the heath and device data about the overall health of the run-time portion of the plant (i.e., the devices not involved in a current or ongoing project), both raw and statistical data, will be grouped without the data from the devices in an ongoing project, so that this run-time data is correct with respect to all of the run-time operational devices. This feature prevents devices in projects from skewing the statistical information about the overall status or health of the run-time portion of the plant. Once the project is complete and the devices in the project are ready to placed back into the live or run-time system, the project will be marked complete and, at that time, all of the alerts and health information from those devices will start rolling up under the running plant metrics.

The device manager and device viewer applications 192 and 194 discussed herein thus enable a user to define a set of devices (e.g., plant assets) that are part of a project and these applications group those devices together to keep track of the health and device state of those devices under the project separately, and further remove the health and other device data of the devices within a project from the run-time data. The user is also able to inform the applications 192, 194 when a project has been completed, at which time the applications 192, 194 move all of the devices for that project back to the running or on-line health calculations. However, the applications 192, 194 may store the information for the project in the asset database 184 or other database to enable the customer to go back and look at how the overall health or device states for the project progressed through the project lifecycle. Thus, the asset management system, by allowing a set of devices to be grouped together as part of a project, is able to recognize the devices that are part of an active project and have the alert, health, and calibration information stop counting towards the run-time health of the plant, but instead determines a separate statistic related to the overall health of the project. Then, once the project is marked as completed, the system moves the devices back into the overall health of the run-time system. Of course, the devices associated with a project could be any plant assets, including field devices, controllers, I/O devices, etc.

Moreover, in the past, during the commissioning phase or plant turnaround phase of a project in a plant, the instrumentation technician and engineer did not have an organized manner of viewing the statistics and data of just the devices involved in the project. To complicate matters, multiple such projects may have been going on at the same time and so all the statistics and information gathered typically only reflected the aggregated data, and may not have been focused on any specific project. The asset management applications, and in particular, the asset manager application 192 and the asset device viewer application 194, either alone or in some combination (and referred to collectively herein as the asset management applications), may operate to provide a user with the ability to specify which devices are a part of projects and then get information and statistics concerning just those devices as they pertain to the project, without having other data about the plant tainting the results. The instrumentation engineer can then get statistics and information about the devices in the project such as health, alerts, progression, availability, or activity, and that information will be specific and applicable to the projects into which those devices have been separated. Multiple projects may be happening at once in a plant so information can be divided up based on the project to which the devices belong, if any.

During operation, the asset management applications 192, 194 may execute on one or more processors of one or more devices (computer devices) in which they are installed to allow the user to define what field devices or other plant assets are part of the commissioning, plant turn-around, or other project, and to group these devices in that manner. Once this grouping is finished, the asset management applications 192, 194 enable an instrumentation engineer to view summaries, charts, statistics and trends of the device health, device state, and other valuable information about the project and about the devices within the project. The user is also able to add or remove devices from the list of devices in a project.

This project grouping is valuable as certain situations and alerts tend to cause alarms and require attention for a normal, "day to day" running of a plant, but that same information would be meaningless for devices in a commissioning or plant turn-around process, and only distract the user from making the correct decisions during those phases. As an example, the commissioning process involves purchasing, setting up, and integrating devices into the plant. These steps are unique to the commissioning process and are not normally conducted in the usual running of the plant. It is advantageous to gather and display device and project information in a manner that reflects the progress of the commissioning project and that allows the instrumentation engineer insight about the headway of the project. As devices move through the various stages (e.g., device states and health states) during a project, alerts and notifications that were once irrelevant may now be important and valuable to the instrumentation engineer as these devices near the completed state. By considering the progress of the project, the most relevant data can be conveyed to the engineer. Thus, the asset management applications 192, 194 can use the project definitions to ascertain and display the health of devices (in a project) and can obtain separate health for specified groups of devices for periods of time that coincide with durations of commissioning and turn-around projects. The asset management applications 192, 194 can also track the progress of devices through a commissioning or a plant turn-around, and can calculate the total progress of the project as a whole. Still further, with the project definitions, the asset management applications 192, 194 can track not only the devices that are currently in a plant, but can also track and represent devices at the earliest stages of a commissioning project, e.g., even when the devices are not yet introduced into the plant. This ability enables the asset management applications 192, 194 to determine (compute) and provide valuable statistics that cannot be deduced when only considering the devices currently installed in the plant. An example of this situation occurs when an instrument engineer knows that a project is going to involve 500 devices, but 400 of the devices are still being shipped to the site. In this case, the asset management applications 192, 194 may determine statistics assuming that there are 500 devices and knowing that only 20% of those devices have been delivered or commissioned, instead of only being capable of reporting that 100% (100 out of 100) known devices in the plant were delivered or commissioned.

Moreover, using the project definitions, the asset management applications 192, 194 may use a variety of measurements or device parameters stored for a device to determine if the project should be considered complete, rather than relying on traditional checklist style methods for determining if a project is complete. Such measurements may include, for example, the total number of device alerts for devices in a project, the standing time of those alerts, the total number of devices within a project that have gone through calibration, the average amount of time since a configuration change has been made on any of the devices in a project, etc. Any or all of these or other measurements may be used to determine the completion state of a project. Moreover, the statistics and data gathered from a group of devices going through a plant turn-around or other project can provide actual values that can be compared to existing metrics and targets that define a process plan for moving forward with the project. As such, using the project definitions, asset management systems can produce very precise requirement data that must be achieved before continuing through gates in a project process timeline.

Of course, the project definition concept can be applied to more than just commissioning and plant turn-around projects and can, instead or in addition, be used for other project types or any time a group of devices or assets need special attention for a duration of time where certain metrics can be gathered on just those devices or assets that are helpful to the process taking place during that duration. Moreover, any assets of the plant can be tracked using project definitions.

As another example, the asset management applications 192, 194 may use the project based information (both raw device data and statistical device data) to provide information to a user that enables the user to determine the overall status and progress of a project. As an example, in a commissioning project, the user may be able to see a percent complete statistic calculated based on the number of devices in the project that are at a complete stage or some other stage of commissioning. More particularly, commissioning is the phase of plant operations between completion of plant construction and commercial operations. During this phase, instrumentation must be configured, tested, and verified as ready for plant operations to begin. Because the commissioning phase of a project is at the end of construction and just prior to operations, this phase is almost always on the critical path to on-schedule startups. Current studies show that 65% of projects over $1 billion and 35% of project under $500 million startup late or over budget. Thus, it is important to provide visibility and planning information for current projects and offer insight for the planning and execution of future projects.

The asset management applications 192, 194 as described herein can also provide an accurate estimation of project duration using actual information collected by the asset management system. Using the concept of projects within the asset management system allows for the tracking of devices/instrumentation that must be commissioned, for example, for a project to be complete. The tracking of the completion on individual devices/instrumentation can be performed manually or algorithmically by the asset management system depending on the device and the required tasks to be accomplished. Using this information, current and future projects can be planned with confidence, and schedules can be improved by applying the proper resources where they are needed at the appropriate time. As part of this planning and scheduling information, the asset management software or applications 192, 194 may create and display trend graphs that show project progress towards completion, and reports to show overall project progress. Moreover, the asset management software 192, 194 may implement methods to track commissioning or other project tasks to completion, may historize all the data and store this data for future analysis and use, and may produce analytical planning reports that show the manner in which future projects can be expected to progress based on asset type, count, and implementation as compared to past or completed projects.

Likewise, the asset management applications 192, 194 described herein may generate various reports that are useful or helpful in completing a project. As an example, the system described in U.S. patent application Ser. No. 14/477, 266, entitled "Bulk Field Device Operations" allows users to map user configurations to live devices to allow the user the ability to bulk transfer a set of device parameters to a list of live devices to thereby improve the time to commissioning of a plant. In doing this, however, a new problem arose where customers do not have the ability to see the result of the bulk transfer for each device. However, users need to be able to quickly determine if the user configurations that were sent down to the device during the bulk configuration process were successful or if there were failures, and to see which transfers failed and for what reason. The asset management applications 192 and 194 as described herein can use the device data for a project to produce a report that will indicate such information, including if each device received a bulk transfer configuration, if the transfer was successful and, if not, the reason for the failure. This feature eliminates the need for a user to get a full report of all of the devices in the system and cull through the report looking just for the devices involved in a particular project. These reports can be run from a thin client asset management application 194, for example, and can be in a format that is both PC and mobile device friendly, so the user will be able to run, view, and make timely decisions no matter what platform they are using to view the plant or project data. The reports to be created could include, for example, reports that show the overall configuration and commissioning status of each device in a project, and the reports can be run or created per project and in context of what the user is thinking about versus one global report that the user will need to decipher to get the critical information needed for the group of devices about which the user is concerned. Moreover, the reports can be produced in a format that is easily usable by the user so that the user can manipulate the list even further to quickly dive down to the specific devices about which the user is concerned.

Figure 2:
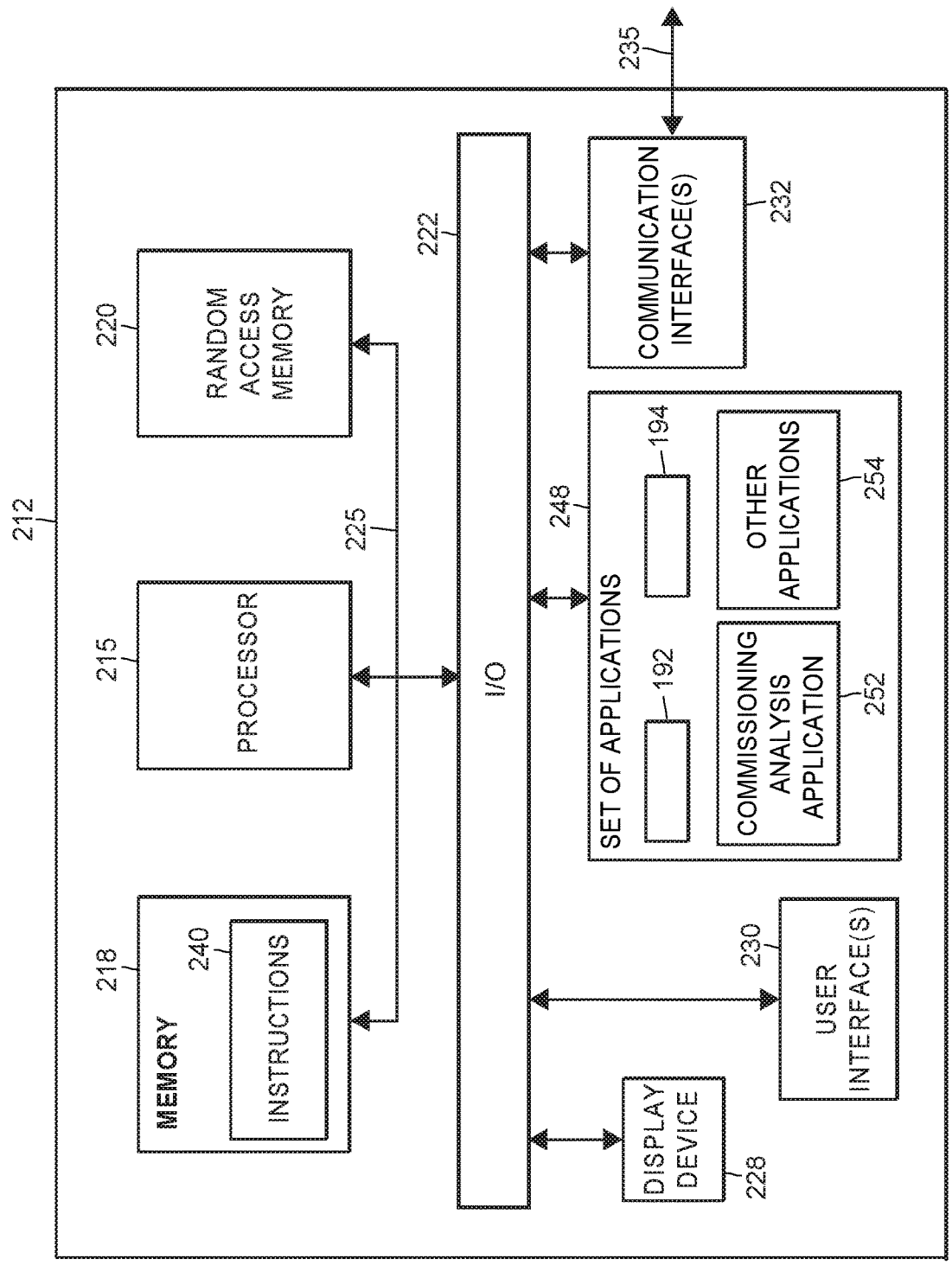
FIG. 2 illustrates a block diagram of a asset management device configured to obtain, store, and analyze data and parameters related to the various plant assets associated with one or more projects within a process plant.

FIG. 2 illustrates a simplified block diagram of an example asset management device 212 (also referred to herein as a system or apparatus 212) that is particularly configured to obtain, store, analyze, and present data (statistical and raw) data and parameters related to one or more projects, such as the commissioning of a portion of a process plant, a maintenance procedure performed in a process plant, etc. The device 212 may be a computer or a computing device, or the device 212 may be another system, apparatus or device that is particularly configured to support the techniques, methods, and systems of the present disclosure, including, but not limited to, cellular telephones, smart phones, tablets or other wireless devices, personal digital assistants, media players, appliances, to name a few. The device 212 may be incorporated into one or more of the components of the process plant 5 (e.g., the operator workstation(s) 71, the configuration application(s) 72a, the user interface devices 75, etc.), the asset management server 182, the remote asset management server 186, the asset management database 184, etc., as described with respect to the FIG. 1. However, for the ease of discussion and not for limitation purposes, the device 212 is referred to herein as a computing device 212 and is described as the asset management device 182, in possible combination with the asset management database 184 and the remote server 186.

The example computing device 212 includes a processor 215 for executing computer executable instructions, a program memory 218 for permanently storing data related to the computer executable instructions, a random-access memory (RAM) 220 for temporarily storing data related to the computer executable instructions, and an input/output (I/O) circuit 222, all of which may be interconnected via an address/data bus 225. In some configurations, the processor 215 is a multi-core processor or processor that has co-processing capabilities (e.g., quantum, cell, chemical, photonic, bio-chemical, biological processing technologies, and/or other suitable co-processing technologies). In some configurations, the memory 218 and/or the RAM 220 are implemented using high-density memory technology, such as solid state drive memory, flash memory, semiconductor memory, optical memory, molecular memory, biological memory, or any other suitable high density memory technology. In an example configuration, the computing device 212 includes multi-core processors and/or high-density memory technology.

It should be appreciated that although only one processor 215 is illustrated in FIG. 2, the computing device 212 may include multiple processors 215. Similarly, the memory of the computing device 212 may include multiple RAMs (Random Access Memories) 220 and/or multiple program memories 218. The RAM(s) 220 and/or program memories 218 may be implemented as one or more semiconductor memories, flash memories, magnetically readable memories, optically readable memories, biological memories, and/or other tangible, non-transitory computer-readable storage media, for example. Additionally, although the I/O circuit 222 is shown as a single block, it should be appreciated that the I/O circuit 222 may include a number of different types of I/O circuits. For example, a first I/O circuit may correspond to a display device 228 of the device 212, and the first or a second I/O circuit may correspond to a user interface 230 of the device 212. The user interface 230 may include, for example, a keyboard, a mouse, a touch screen, a voice activation device, and/or any other known user interface device. In some embodiments, the display device 228 and the user interface 230 may be jointly incorporated in a single physical device, e.g., a touch screen. Additionally or alternatively, the display device 228 and/or the user interface 230 may be incorporated into a device separate from the computing device 212. For example, the computing device 212 may be implemented within the operator or maintenance workstation 71, and the display device 228 and/or the user interface 230 may be implemented within the user interface device 75, one of the thin client devices 188, etc. of FIG. 1.

The computing device 212 includes one or more network or communication interfaces 232 via which one or more respective links 235 to one or more respective communication or data networks are accessed. The communication interfaces 232 may include interfaces to one or more process control specific communication and/or data networks, e.g., Fieldbus, Profibus, HART, 4-20 mA loops, WirelessHART, process control big data, etc. For example, the computing device 212 may include an interface to a process control big data network. Additionally or alternatively, the communication interfaces 232 may include one or more interfaces to general purpose communication and/or data networks, e.g., Ethernet, NFC, RFID, Wi-Fi, etc. A link 235 to a communication or data network may be used as a memory access function (e.g., to access data in a database such as the asset management database 184), and/or a link 235 may be a wired, wireless, or multi-stage connection. Many types of interfaces 232 and links 235 are known in the art of networking and may be used in conjunction with the computing device 212.

The computing device 212 includes one or more sets of particular computer executable instructions 240 stored thereon, and as such, the computing device 212 is particularly configured at least in part by the particular one or more sets of instructions 240 stored thereon. As used herein, the terms "computer-executable instructions," "computer executable instructions," and "instructions" are used interchangeably. As shown in FIG. 2, the instructions 240 are stored on the memory 218 and executable by the processor 215 to perform any portion or all of the methods and/or techniques described herein. The one or more sets of instructions 240 may comprise one or more engines, routines, applications, or programs including an operating system. A set of applications 248 may be included as part of the one or more sets of instructions 240. In embodiments, the set of applications 248 may include the asset manager software or application 192 and/or the device viewing software or application 194. The applications 192 and 194 may be combined into a single application or a single device (as illustrated in FIG. 2) or may be provided, stored, and executed in separate or different computing devices (as illustrated in FIG. 1). In addition, if desired, a separate commissioning analysis application 252 that is configured to obtain and analyze commissioning data of field devices, compare the commissioning data to stored parameters, and determine information to present via the display device 228 and/or the user interface 230 may be provided. The set of applications 248 may include a set of other applications 254 or other sets of instructions 240 and/or other elements or components.

By way of background, one type of project that may be implemented using the systems of FIGS. 1 and 2 includes commissioning projects. Generally speaking, process plants are commissioned prior to operation in a run-time mode to ensure that the systems and components of the plants are designed, tested, installed, operated, and maintained according to the operational requirements of the owners or clients, thus guaranteeing the operability, performance, reliability, safety, and information traceability of the process plants. As is known, commissioning of plant devices may occur on a large scale when a plant is first built or constructed, when a plant is retrofitted with new equipment, or when a plant is expanded to include new capabilities, process lines, areas, etc.

Commissioning of process control systems and/or plants includes various techniques, systems, apparatuses, components, and/or methods that allow for at least some portions of the commissioning process to be performed locally, automatically, and/or distributively, so that devices and/or other portions of a process plant may be partially or even entirely commissioned prior to being incorporated or integrated into the plant or system as a whole and before the devices are powered on. Commissioning allows, for example, various portions of process control systems to be built and at least partially commissioned at different geographical locations (e.g., at different "mod yards") prior to being brought together and integrated at the resident location or site of the process plant. As a result, commissioning allows for parallel commissioning activities and actions to take place.

A process plant may be commissioned according to a set of baseline or defined parameters, where the set of baseline or defined parameters specify how each field device within the process plant should be commissioned. However, in operation, the field devices may not be commissioned according their respective parameters, which may result in error conditions and alarms, and/or may necessitate additional repair and maintenance. More particularly, devices or other plant assets may need to undergo a number of steps or stages during a commissioning project to be commissioned (i.e., ready for use in the run-time plant). In the simplest case, each device or plant asset associated with a commissioning project may be considered to be in one of two states, including a commissioned state and a not yet commissioned state (e.g., a non-commissioned state). In some instances the non-commissioned state may include sub-states through which the device progresses to become commissioned. Such sub-states (which may or may not be needed to be progressed through in a sequential manner), may include being installed in the plant, being bulk configured, being tested (according to one or more testing procedures which may depend on the type of device), being a virtual device, etc. Thus, devices in a commissioning project may have two or more commissioned states. In this case, a device may be in a completely uncommissioned state, and may progress through various different or distinct commissioning procedures or activities such as a virtual state (meaning the that device is known to be needed in the project or at the plant but has not yet arrived at the plant and is thus still a virtual device), a device in inventory state, an installed state, a configured state, a tested state, etc., on the path to becoming a commissioned state, Of course, the device may be in more than one non-commissioned or pre-commissioned state at the same time (e.g., a device may be in an installed state and a configured state but not yet in a tested state). In other cases, a device may be considered to be in one of two states, including a commissioned and a non-commissioned state, and one or more of these states may have various attributes or parameters that may be need to be met or checked prior to the device moving to the other state. Thus, a non-commissioned state may include sub-states defined by the values of parameters related to or defining various commissioning procedures which have been or need to be applied to the non-commissioned device (e.g., installation, configuration, testing, etc. procedures).

Thus, as noted above, commissioning a process plant may include the configuration of field devices according to a set of parameters, which may be default parameters or modifiable by an administrator of the process plant. In certain aspects, field devices may be configured in bulk using a configuration template or similar technique, such as those disclosed in aforementioned U.S. patent application Ser. No. 14/477,266. Before, concurrent with, or after the field devices are configured, the process control system may facilitate additional commissioning operations, including confirming an identity of an installed process control device (such as a field device) and its connections; determining and providing tags that uniquely identify the process control device within the process control system or plant, verifying the correctness of a device installation by manipulating signals provided to the device, and generating as-built I/O lists to indicate the actual physical connections of the device as implemented within the plant.

Generally, a template, requirements document, or the like may include a set of defined commissioning parameters that specify how field devices of a process plant are to be commissioned. Additionally, the actual commissioning state, status, or condition of the field devices may be embodied in commissioning status data for the field devices. The systems and methods described herein obtain the commissioning status data associated with the field devices, (which data is stored as part of the device or as device parameters for the device in the asset management database 184, the configuration database 72b, etc.) and compare the commissioning status data to the set of defined commissioning parameters to determine (i) which, if any, of the field devices are not commissioned according to the defined parameters, and (ii) how the determined field devices deviate from the defined parameters.

The systems and methods may further generate a set of interfaces that may indicate the determined field devices and how they deviate from the defined parameters, the device states in which the devices are currently located, the health status of the devices, etc. A user or administrator associated with the process plant may access the set of interfaces to review the information, make selections, and initiate certain functionality. In particular, the user or administrator may select to modify the defined parameter(s), may select to re-configure or re-commission a field device to match the respective defined parameter(s), and/or may initiate other functionality.

In a similar manner, maintenance procedures may be applied to a group of devices in a plant (e.g., to a unit, an area, etc. of a process plant, as those terms are used in the S88 plant hierarchy standard) as part of a maintenance project. As an example, a maintenance project may require that various devices of a unit (such as a refinery cracker) be taken off-line and cleaned and calibrated as part of maintaining the unit. In many such cases, a number of field devices or assets are taken down and the various maintenance procedures are applied to the devices to perform the maintenance. In a similar manner, devices or assets undergoing or involved in a maintenance project may go through various states or stages (and these states may vary depending on the types of devices involved) as the maintenance project progresses. These states or stages are referred to herein as device states.

Moreover, as is known, devices in a run-time system may have various health characteristics or states associated therewith. For example, in known asset management systems, devices or other plant assets may have a health parameter that may indicate the health state of the device or asset. In one case, the heath state of a device or other asset may be in (1) a good state (meaning the device is healthy and operational), (2) an unresponsive state, meaning the device is not responding to requests for communications, which may occur if the device is shut-down, disconnected from the communication network, disconnected from a source of power, or is undergoing some other serious operational issue, (3) a bad state, meaning that the device has itself indicated that it has an issue that the device has determined, (4) a degraded state, meaning that the device is degraded in some manner but may be operational to some extent, and (5) an unknown state. Of course, these are but one example of a potential set of health states of a device or asset and other health states may exist or be used in various other systems.

While a typical plant asset management system may enable a user to view a listing of devices based upon physical characteristics (e.g., device location, device type, etc.) or behavioral parameters (safety instrumentation, alert status) and to view the health status of these devices, these current systems are not able to create a group containing a list of devices that are related to a planned commissioning, maintenance or installation process that the devices will work through together. Examples of planned processes (called projects herein) include, for example, a plant expansion, a new plant startup, a plant turnaround, a product switchover, a large maintenance process, or other significant plant actions impacting multiple devices.

The device viewer application 194, however, in conjunction with the device manager application 192 and the asset database 184, is configured to allow process control system users to easily define a grouping of devices in relation to a planned process, again referred to as a project. The device manager application 192 and/or device viewer application 194 allow the user to define which devices will be part of a project and to store the list of devices as a project having an associated group of devices. Note that the list of devices is not limited to devices in a certain area or region of the plant, devices of a certain device type or status, devices in certain health or status state, etc., but can include any device or plant asset that is associated with a project and that will, for example, not be operating in a run-time condition or configuration during the project. Moreover, during the time that the devices are indicated as being part of an ongoing or open project, all available device information can be viewed together under that project to show the condition of each of the devices included in the project and the asset management applications 192, 194 can compute and provide statistical information pertaining to the progress or state of the project based on the states or conditions of the devices in the project. Once a project is completed, the device manager and/or viewer applications 192, 194 can close the project and place the devices in the project back into a run-time operational state. However, even after the devices are no longer part of an active project, the asset database 184 may still store and the device manager and device viewer applications 192, 194 may access and present historic information about the project or devices in the project for reference purposes. This historic information could include the project name, the number of devices included in the project, the date the project was created, the date the project was completed, historical and/or statistical device state data and health state data at various times or points in the project, etc.

Figure 3:
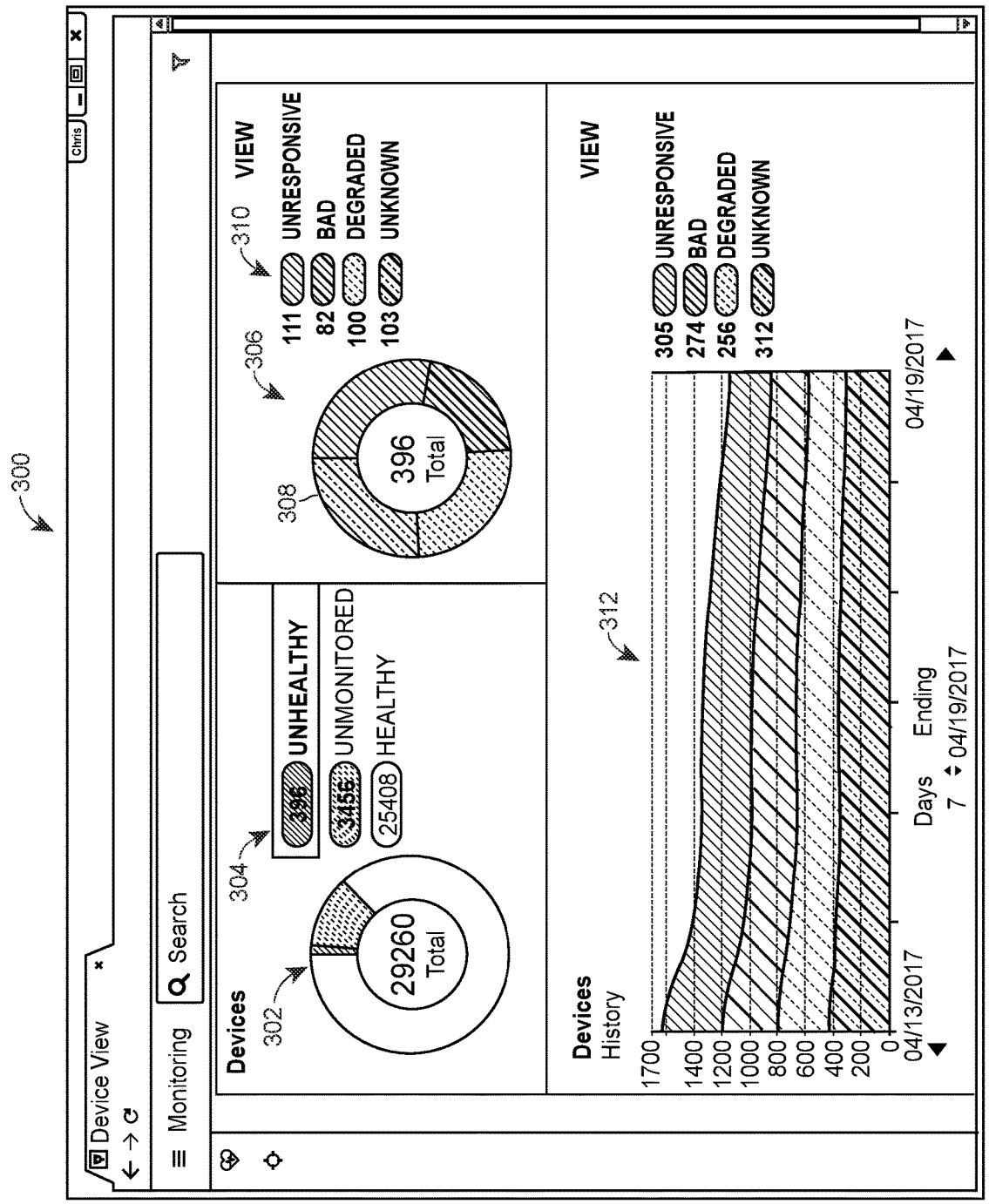
FIG. 3 illustrates an example user interface that may be produced by an asset management system depicting various statistical information pertaining to devices or assets within a process plant without including data from devices within any projects in the plant.

FIG. 3 illustrates an example user interface screen 300 that may be produced by the asset manager application 192 or the device viewer application 194 of FIGS. 1 and 2 based on device or asset data 193 or 196 stored in the database 184, for example, to indicate some statistical information regarding the heath of the devices in a run-time portion or configuration of a plant. In this case, the user interface screen 300 presents statistical information on the health of the devices within the plant and, more particularly, on the health of devices operating within the run-time system of the plant. As indicated by the graphics 302 in the upper left-hand corner of the screen 300, the total number devices in the run-time system of the plant is 29260, with 396 of the devices being in an unhealthy state, with 3456 devices being in an unmonitored health state, and with 25508 devices being in a healthy state. As will be seen, the individual icons 304 indicate the number of devices in each of these health states. Still further, in this case, the unhealthy icon 304 has been selected and, as a result a graphic 306 in the upper right-hand corner provides a breakdown of the specific health status of each of the 396 unhealthy devices. Again, as illustrated by a graphic 308, a circle with various portions colored or otherwise marked according to the different health states defined by the icons 310 illustrates a summary of the specific health states of the 396 unhealthy devices.

As indicated above, the icons 310 indicate the various types of unhealthy status conditions associated with the 396 unhealthy devices and the number of devices in each of these states, including 111 devices that are "Unresponsive," 82 devices that are "Bad," 100 devices that are "Degraded," and 103 devices that are "Unknown." Still further, a graph 312 at the lower half of the user interface 300 indicates the number of devices in each of the Unresponsive state, the Bad state, the Degraded state, and the Unknown state over a period of seven days from Apr. 13, 2017, to Apr. 19, 2017. The graph 312 indicates that, generally speaking, the number of unhealthy devices has been decreasing over the selected period of time presumably due to, for example, activities by the operators or device maintenance personnel in correcting conditions leading to the unhealthy devices.

Here it will be noted that the information and statistics illustrated in the user interface 300 of FIG. 3 are related only to devices or plant assets in the run-time system, i.e., those which are not part of any project. In fact, to create the interface 300, and the graphics and statistical data therein, the applications 192, 194 may cull through the device data 193 stored in the asset database 184 and eliminate or not use device data for any device that is marked (i.e., that has a project parameter 193*a*) indicating that the device is within a currently open or running project. In this manner, the asset management system 192, 194 can provide raw and statistical device data for only the operational or run-time part of the plant without including data regarding devices involved in a project, as such data may skew the plant health statistics to look worse than they are for the run-time or actually operating portion of the plant.

To create a project, the device viewer application 194 or the device manager application 192 may enable a user to populate a spreadsheet or other data structure with a list of device tags which are to be included in a named project to thereby define the project. The process control system, e.g., the device manager application 192, a configuration system application 72*a*, etc., could then verify that the device tags listed in the spreadsheet are available for project inclusion (e.g., that the devices exist in the system database(s), have device information stored therefor, etc.) and may inform the user of any issues with project creation as defined in the spreadsheet. After the spreadsheet is filled, and after all issues are resolved, the device manager application 192 can group those devices together with the defined project name, and the project and device statistics about the project can then be displayed to all control system users with access to the plant control system. At this time, the asset management system, such as the device manager application 192, may fill out or store, for each device file 193 in the project 196, a device parameter 193*a* (referred to herein as a project field or a project parameter) within the asset management database 184 and/or in the configuration database 72*b*. The project parameter 193*a* of each device file 193 may indicate whether the device is part of an ongoing project or not and, if so, the name or other identifier of the project. This parameter may refer to or identify a project 196 to which the device is currently associated. If the project parameter 193*a* of a device file 193 indicates that the associated plant device is part of an ongoing project 196, then the device is not part of the run-time or operational system. The project related device parameters 193*a* may also include a project name and/or any other project identifier defining the project 196 to which the device is associated, information about the nature of the project 196 as well as any other desired project related information. In some cases, the user may be able to add virtual devices (e.g., devices that are not yet installed or present in the plant) to the list of devices for a project 196. In this case, the user may be asked to provide information for the virtual device, such as a device name, type, tag, manufacturer, configuration parameters, location, etc. for the virtual device. Enabling a user to define or add a virtual device within a project list may then cause the device manager application 192 to create a device data holder 193 in the asset management database 184 and/or in the configuration database 72*b* associated with the virtual device to let the control system know that the virtual device exists, in some manner (e.g., as a planned part of a project), prior to the physical device actually being present at or installed in the plant 5. In this manner, the device viewer application 194 can provide information about all of the devices that are part of a project (including virtual devices not yet at the plant), and can include those virtual devices in statistics associated with the created project.

Of course, whenever the project is complete, a user can use the device viewer application 194 or the device manager application 192 to mark the project as complete. At this time, the device manager application 192 can change the project parameters of the devices within the project (e.g., in the databases 184, 72*b*, etc.) to that of not being associated with an ongoing project, thereby returning (or adding) the devices in the now completed project back to the run-time system of the process plant. The device manager application 192 or the device viewer application 194 may then archive (store) the associated project information in the asset database 184 or other database for future use. In other cases, the device manager or viewer applications 192, 194 may automatically recognize completion of a project based on statistical information about the devices in the project (e.g., that all of the devices in the project are in a commissioned state or have undergone all maintenance procedures associated with the project or any of the measures discussed above), and may mark the device project parameters 193*a* for each of the devices in the completed project as no longer being associated with an ongoing project.

Moreover, once a project 196 is created, the other applications in the run-time system may view the project related device parameters 193*a* of a device file 193 for a device to determine if the device is currently associated with a project 196, and if so, may ignore or treat the device differently than if the device is in the run-time system (i.e., not associated with an ongoing project). For example, an alarm viewing application may ignore or filter out alarms from devices in an ongoing project based on the project status parameters of a device that is generating an alarm or alert, because the alarm viewing application knows that the device is involved in an ongoing project (and so expects that the device will normally be in various alarm or alert states during the project), or the alarm viewing application knows that the device is not involved in the run-time operation of the plant and so the device alarm or alert is not important to the plant operator using the alarm viewing application regardless of the priority of the actual alarm or alert being generated by the device. In another example, a configuration application may operate differently with respect to devices in an ongoing project and those not in an ongoing project. Still further, as illustrated in FIG. 3, the device manager application 194 may ignore or filter out device information from devices involved in a project when presenting general statistical information about the plant assets (e.g., device states and device health information) to thereby make the statistical device status and health information accurate for the run-time devices, without including or considering information associated with the devices in a project which are not expected to be in a run-time condition.

Figure 4:
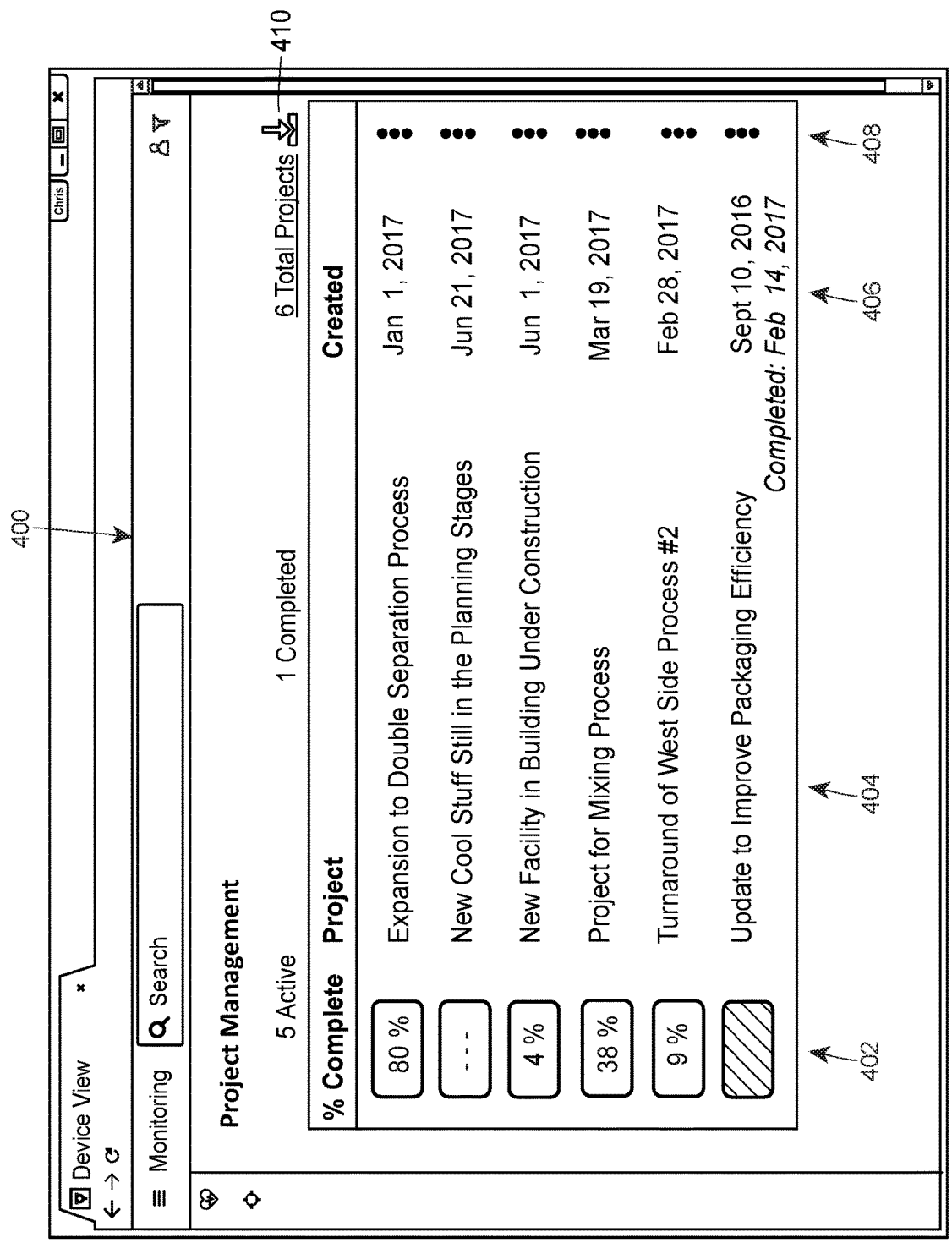
FIG. 4 illustrates an example user interface that may be produced by an asset management system to illustrate or create one or more projects to be tracked within the asset management system.

FIG. 4 depicts a user interface screen 400 that may be produced by the device viewing application 194 and/or the device manager application 192 to indicate to a user the projects 196 currently existing and/or that have been completed within a plant. The device viewing application 194 may produce the screen 400 on any suitable user interface, including any of the thin client devices 188 of FIG. 1, the operator or maintenance workstations 71, the user interface device 75 of FIG. 1, etc. In any event, the example screen display 400 depicts a list of projects that have been created including, in this case, six projects that are in various stages of completion. The first five projects are still ongoing projects and the final project is a completed project. The list of projects includes a first column 402 including an icon or graphic that indicates the percent completion of the project, a second column 404 that indicates the name given to the project, a third column 406 that indicates the creation date and potential completion date of the project, and a fourth column 408 that includes an icon (referred to as a further details icon) in the form of three vertical dots. The further details icon 408 may be used or selected to enable the user to view further details about the project or to take actions with respect to a project, such as, for example, renaming the project, deleting the project, marking a project as complete, triggering a configuration validation report, which will be discussed in more detail herein, adding devices to a project, removing devices from a project, etc. As will be discussed in more detail below, the percent completion of a project, as provided or displayed in the first column 402, may be determined by the asset management applications 192, 194 based on status or other information regarding individual devices within each project, and the asset management applications 192, 194 may automatically calculate these completion numbers based on the individual device statuses of the project and various rules defined for or stored for calculating a completion percentage of a project. Moreover, as illustrated in FIG. 4, the last project is complete as it has an icon 402 grayed out, indicting a completed project. If desired, the screen 400 includes an icon 410 that enables a user to export the list for processing in, for example, Microsoft Excel, or for printing.

Figure 5:
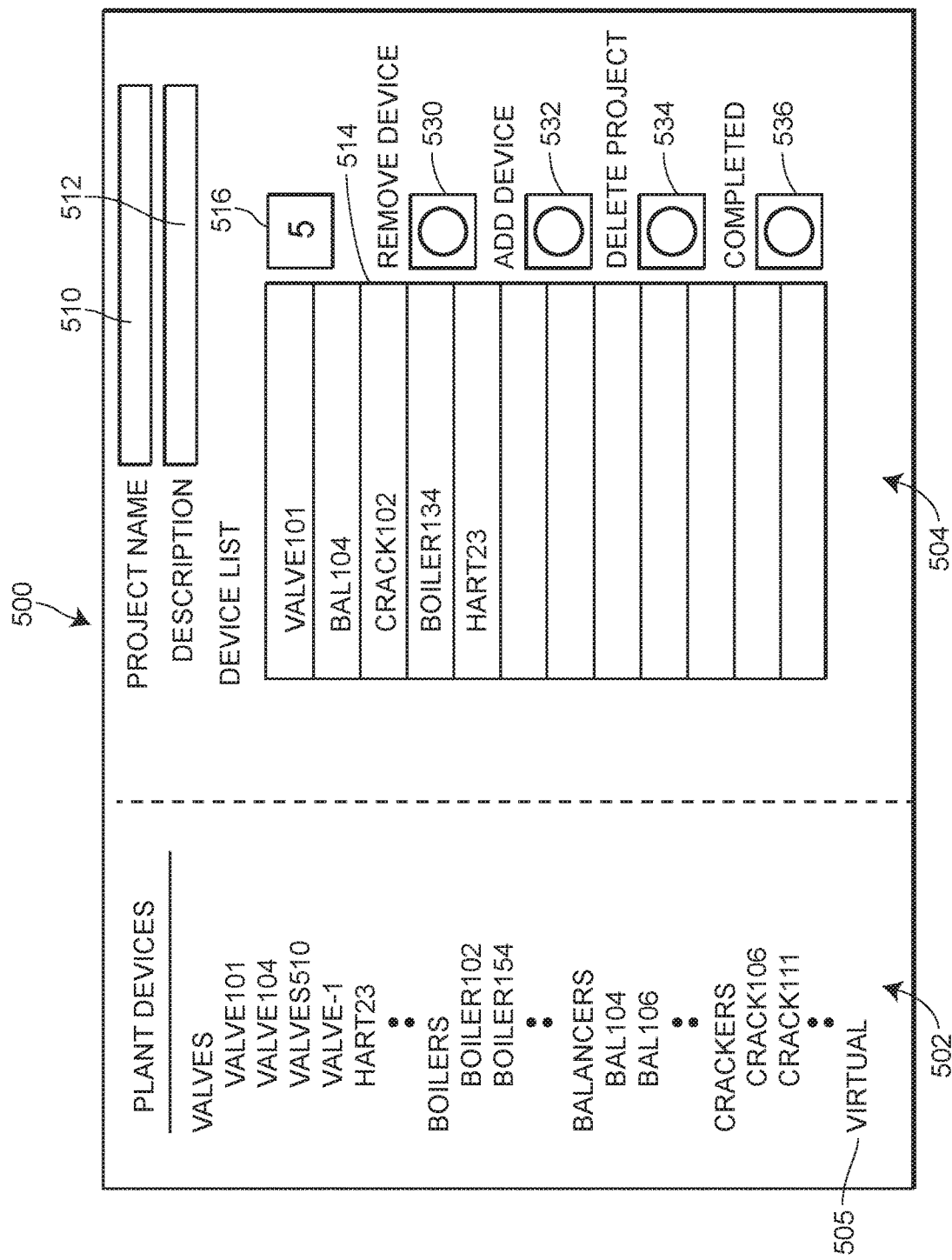
FIG. 5 illustrates an example user interface that may be used to create or edit a project including the list of devices within the project, such as in any of the projects illustrated in FIG. 4.

FIG. 5 illustrates an example project creation user interface screen 500, which may be accessed by selection of the icon 410 of the screen 400 of FIG. 4, and which may be used to enable a user to create a new project or to change the status, state, description of, name of, etc. an existing project, as well as to add or remove devices from a project. In particular, FIG. 5 illustrates an example project creation/change user interface screen 500, which may be used to define a project, including defining a list of devices within a project, providing a project name, providing a project description, and providing other information about a project, all of which will be stored in the asset database 184 as part of a particular project 196. As illustrated in FIG. 5, the example project definition screen 500 includes a device information or hierarchy section 502 on the left-hand side of the screen 500 and a project configuration section 504 on the right-hand side of the screen 500. In particular, the device information section 502 may include a hierarchy or other listing of devices that are currently within the plant, organized in any desired manner. This information may come from the asset management database 184, from the configuration database 72b, or from any other database or source within the plant in which the device tags or other device information is stored. This information can be imported or obtained by the device manager or device viewer application 192, 194 from an asset or configuration database 184 for example, and this data is used to populate the hierarchy section 502. As illustrated in the example screen of FIG. 5, the hierarchy section 502 includes devices organized by device type, including valves, boilers, balancers, crackers, etc., and includes device tags for devices within those device types. However, any other kind of hierarchy or organization of devices within the plant could be used as well to provide a user with a list of devices that may be added to a project.

Figure 6:
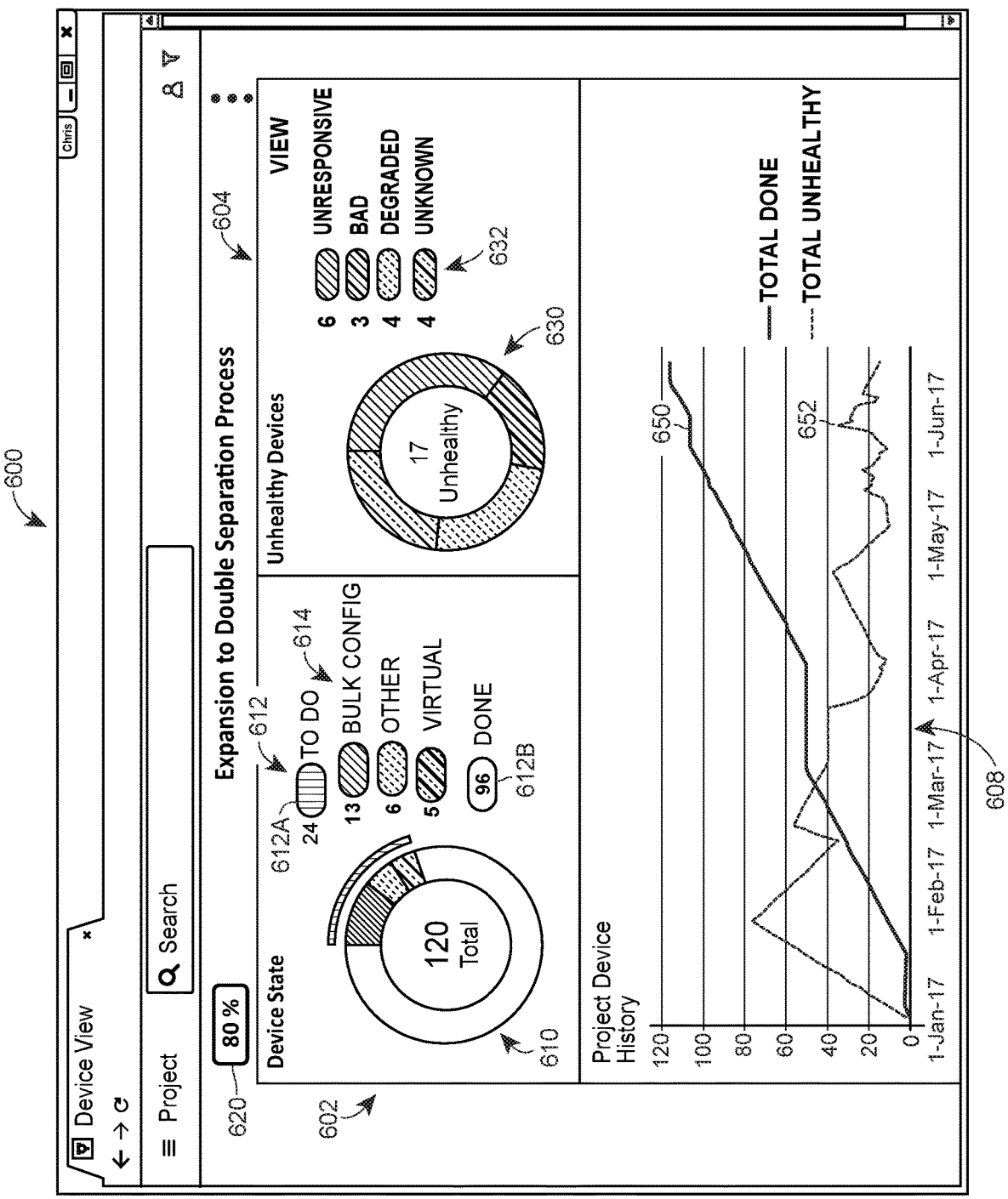
FIG. 6 illustrates an example user interface that may be produced by an asset management system to depict current and historical statistical information regarding device states and device health information for assets within a particular project.

As indicated in FIG. 5, the plant devices within the hierarchy can include virtual devices, and a Virtual Device icon 505 can be selected by a user to add one or more virtual devices that are to be associated with the project but do not yet exist within the plant hierarchy, configuration database 72b, or asset management database 184. In some cases, the user can select the virtual device icon 505 and obtain a pop-up screen from the application 192, 194, that enables a user to define and enter the virtual device information, including a device type, a manufacturer, a tag name, a location of the device, configuration parameters of the device, etc. When such a virtual device is created, this device may then show up under a different device type in the hierarchy section 502 based on the device type stored for the virtual device, and the application 192, 194 may save this device as a new device file 193 in the asset database 184 with a device state parameter set to be a virtual device. When the actual device corresponding to the newly created virtual device is installed in the plant, the applications 192, 194 may change the device state of the device to a different device state, such as the Other state or the Bulk Configuration state as illustrated in FIG. 6.

To create a project, a user may type in or provide a project name in a screen section 510, and a project description in a screen section 512. While not illustrated in the screen 500, the user may be provided other input fields to provide other information about the project. Still further, the user may be able to select individual devices within the hierarchy or device list 502 and drag these devices over to the section 514 to populate a list within the section 514 with the devices that are to be associated with the project. In this case, the user may select the Valve 101 icon, may drag the icon above the configuration section 514, and may drop the icon (using a mouse or other input device) into the section 514, at which time the application 192, 194 will recognize that the device with the device tag Valve 101 is to be added to the device list for the project. The application 192, 194 may then populate one line within the configuration section 514 with information about the device associated with the device tag Valve 101. At this time, the system (e.g., one of the applications 192, 194) may actually determine whether the device having the tag Valve 101 is able to be placed into a project based on data within the asset management database 184, for example, about that device. For example, if configuration information about the device with the tag Valve 101, is not configured or does not exist within the plant, the device Valve 101 is associated with a different project, or is somehow marked as not being able to be associated with the new project, the application 192, 194 may indicate a problem that needs to be addressed prior to the device being associated with the project.

Of course, the user can drag and drop or otherwise select other devices to be placed within the project list defined by the configuration screen section 514 until all of the devices of the project have been populated within the list displayed in the configuration section 514. Additionally, if desired, a graphic 516 on the screen 500 may indicate the number of devices currently within the project and this number may be incremented or decremented as devices are added to or deleted from the list of devices within the configuration screen section 514. Of course, the user may remove or delete devices from the project list by selecting a device within the configuration list 514 and by either dragging it out of the list or by otherwise deleting it (e.g., through a pop-up screen, a right click action on a mouse or other user interface action).

Likewise, if desired, additional icons (e.g., radial buttons) 530, 532, 534, and 536 may be used to alter or change the number of or the identity of devices within the list of devices for a project, or to otherwise mark the project as being either ongoing or completed. For example, the icon 530 may be used to remove a device. A user may select the icon or button 530 to indicate that the device selected within the device list 514 is to be deleted. An icon 532 may be used to add new devices or to indicate that the user will want to move new devices (e.g., those illustrated in the hierarchy 502) into the device list 514. An icon 534 may be used (e.g., selected) to delete the entire project, while an icon 536 may be used to mark the project as being complete in a manual manner. Thus, the user interface screen 500 can be used to create new projects as well as to change the status of existing projects, to add or delete devices from new or existing projects, to change the name of or details about a project, etc. Of course, the user may enter other information in the screen 500 or in pop-up screens associated with the screen 500 to further define a project or to make other changes to a project. Upon entering the information in the configuration screen 500, the device viewing application 194 or the device manager application 192 may store this information as project data 196 and as device data 193a in the database 184 to thereby define projects and to associated particular devices files 193 with defined projects. As one example, the applications 192, 194 may change project parameter fields 193a of devices (as stored in the database 184) of each device in a project list to indicate that the device is associated with a project 196.

Moreover, the applications 192, 194 may process the device data of devices within one or more projects to provide a user with further information, including statistical information and specific device information (generally referred to as project metrics), about devices within a project on a project-by-project basis. In particular, upon a user selecting any of the project names or other icons about a particular project in the user interface screen 400 of FIG. 4, the asset management system (e.g., the applications 192, 194) may acquire device data from the asset management database 184 to provide more detail about the project and about the devices (assets) within a project. As an example, the asset management system may provide a project status screen 600, such as that illustrated in FIG. 6, to indicate various statistical and more specific device information, including device state information and device health information, pertaining to the devices within the project. In particular, in the example screen 600 of FIG. 6, device state and device health information is provided for all of the devices within the first project listed in the screen 400 of FIG. 4. The user interface screen 600, which may be created by the device viewing application 194 or the device manager application 182 based on device data only for the devices within the first project listed in FIG. 4, includes three sections 602, 604 and 608. The section 602 provides statistical information about the state of the devices within the project, the section 604 provides statistical information about the health of devices within the project, and the section 608 provides or depicts an historical trend graph illustrating statistical device state and device health information for the project over a period of time.

As illustrated in FIG. 6, the section 602 includes a circular graph 610 that illustrates the total number of devices within the project (in this case, 120), with the circle 610 having sections thereof related to the number devices in each of a set of possible device states, which are also shown by the icons 612. In this case, the project itself is an expansion project, which includes various commissioning activities or states in which a device that needs to be commissioned may be within. The commissioning related device states illustrated by the icons 612 may include two high level commissioning states defined as a To Do state 612A (meaning that the device is not yet commissioned) and a Done state 612B (meaning that the device is commissioned). As will be noted, each of the devices within the project of FIG. 6 falls within one of these two high level device states.

Still further, as indicated by the icons 614, the To Do state 612A includes various, in this case three, sub-states indicating various different sub-states of being non-commissioned. Such sub-states may indicate activities, processes, or other things that have been done or that need to be done to non-commissioned devices to get them into the Done commissioned state or may indicate various different states in which a non-commissioned device may fall. In the example of FIG. 6, 13 of the non-commissioned devices are in a bulk configuration state (which is a non-commissioned state), six are in another state (which may mean that these devices are in a different state than bulk configured, but not yet commissioned), and five devices are in a virtual state, meaning that these devices are still virtual devices and so are not yet at or installed in the plant in order to have other commissioning activities performed thereto. The sub-states or sub-information associated with the icons 614 provides further information about activities that have been or that may need to be performed on the devices in the To Do commissioning state (also called the non-commissioned state) to move these devices to the Done commissioning state. These sub-states thus provide some information about where the devices in these states stand in the overall commissioning process, which provides information that may be used to estimate the time at which the project may be complete, the amount of work to do in the project to complete the project, the type of commissioning activities that need to be performed on the devices in the project to complete the project, the percentage completion of a project, etc.

Of course, the device states 612 could include more states (e.g., three or more) and these device states may indicate sequential or non-sequential (e.g., multiple different) activities that need to be performed on non-commissioned devices to get the devices into a further or completed device state, e.g., a commissioned state. For example, it would be possible to define device states as including three or more different states and device may move from one device state to another device state based on one or more of a set of commissioning processes or procedures being performed on or with respect to that device. It is possible that any particular device may have to go through each state to get to the final commissioned state, or that each device may not need to go through each state to get to the final commissioned state. Still further, any device state could have multiple sub-states associated therewith to further define possible manners in which a device needs to be processed to reach the final or next device state. A device may or may not need to traverse through each sub-state of a device state to go from one device state to another. Thus, in some cases, the device sub-states may define a series of actions that need to be performed on a device in a certain order to move to the next device state. In other cases, the sub-states may define or indicate different actions that need to be performed on the device to move the device to the next state, but a device may not need to have all actions defined by all sub-states preformed thereon to move the device to the next device state. Moreover, while FIG. 6 illustrates an example of, and the use of a rather simple set of device states associated with a commissioning project, other types of projects, such as installation projects, maintenance projects, etc., could have other states, other sub-states and other numbers of states and sub-states defined or used therefor. Still further, the device states and device sub-states could be mutually exclusive (meaning that a device can only be in one state or sub-state at a time) or could be overlapping (meaning that a device could be in multiple states or sub-states simultaneously). While it is typical that the device states and sub-states will be mutually exclusive states, it is possible that the device states may be mutually exclusive while the device sub-states are not mutually exclusive, or vice-versa.

Still further, as can be seen in the example of FIG. 6, the asset management applications 192, 194 can use the device states and in some instances, the device sub-states, to calculate or determine the activities that need to be performed on or with respect to the various devices within the project to complete the project, and the applications 192, 194 may use the number of devices in each state and/or sub-state to determine or calculate the percentage of completion of the project. The applications 192, 194 may store and use any desired formula or set of rules to calculate the completion percentage of a project based on the device states and sub-states and number of devices in each and/or based on other measured information as discussed above. In the example of FIG. 6, the applications 192 and 194 use a simple percentage calculation based on the number of devices in each of the two mutually exclusive device states of To Do and Done. Because there are 120 devices within the project and 96 of these devices are in the Done state while 24 devices are in the To Do state, the system calculates the project completion percentage (as indicated by the icon 620) as 80% complete (i.e., 96÷(96+24)). However, other types of calculations, formulas and/or rules could be used to determine the percentage completion as illustrated in the icon 620 using any combination of device states, sub-states and numbers of devices of the project within the device states and/or sub-states and/or any other information. Thus, for example, the number of devices in the device sub-states or the various sub-states associated with various device states 612 may be used to alter the project percentage completion calculation. For example, the percentage completion calculating application may consider a virtual device as being 0% commissioned, may consider a device that is in the bulk configuration sub-state as being 50% commissioned (and thus count as a device that is 50% commissioned or 50% of the way to reaching the Done device state), and may consider a device that is in the other sub-state as being 25% commissioned (and thus count as a device that is 25% commissioned or 25% of the way to reaching the Done device state). The calculation can the use these percentages as weights in calculating the percentage completion of the entire project. Of course, other manners of calculating the percentage completion of a project based on device statistics and device states and sub-states may be used.

Additionally, the asset management applications 192, 194 may use the screen 600 to provide or illustrate the health status of the devices within the projects and, in particular, the number of devices that are healthy or unhealthy and/or the number of devices in each of a set of different health states. In the example of FIG. 6, the screen section 604 of the screen 600 graphically indicates the health of the devices within the project and, specifically, indicates that there are 17 unhealthy devices of the 120 total devices within the project using the circle graphic 630, and indicates using the icons or graphics 632 the number of devices in each of a set of four different (mutually exclusive) heath categories. In this example, the four unhealthy states or statuses include an Unresponsive state, a Bad state, a Degraded state, and an Unknown state. However, any other number and kind of health statuses or states could be used. The circle graphic 630 additionally has different sized sections (e.g., which are differently colored or hatched) associated with each unhealthy category depicted by the icons 632, with the size of each section being proportional to the number of devices in each of the unhealthy categories relative to the total number of unhealthy devices. While the graphic section 604 may illustrate the health status of all of the devices in the project, this graphic may also be used to illustrate the health status of only devices in one of the device states or sub-states illustrated in the section 602. Thus for example, the 19 unhealthy devices about which statistical information is provided in the screen 600 may be all of the unhealthy devices in the project, all of the unhealthy devices in the Done device state, all of the unhealthy devices in the Bulk Configuration sub-state, etc. Of course, the device health status information provided in the section 604 may indicate further work that needs to be done on devices that have been commissioned in order to complete the project or to ensure that the project, once completed, has devices that are ready for run-time operation.

Still further, the asset management applications 192, 194 may use the screen section 608 of the screen 600 to depict historical information about the project and, in particular, historical statistical information about device states and health states of devices at different times of the project. The example screen 600 includes graphs or line plots 650, 652 depicting the number of devices in the Done device state 612B and the number of devices in any unhealthy state or status, respectively, over a five month period of the project. As illustrated by the example plots 650 and 652, as one would expect, the total number of devices in the Done state increases over time, while the total number of devices having an unhealthy status decreases over time during the life of the project. However, because various different devices of the project may go through various stages or sub-states of configuration or commissioning, the unhealthy device statuses may increase and decrease over shorter time periods based on the particular activities being performed on the devices. In any event, the asset management applications 192, 194 may present any historical statistical device data to the user that is useful to the user, for example using the section 608 of the screen 600 or using separate screens, if so desired. Thus, for example, a user may be able to view a plot of the number of devices in each of the different unhealthy states or statuses over time, in which case, the applications 192, 194 may present the user with a different trend line for each of the Unresponsive, Bad, Degraded, and Unknown health statuses over time. Likewise, the applications 192, 194 may present the user with a plot of the number of devices within the project that are in each of the device states and/or sub-states over time. In this case, the plot or graph may include a separate line for each device state or sub-state, such as for the Bulk Configuration sub-state, for the Other sub-state, for the Virtual sub-state, etc. In any event, this information provides a historical view to the user to allow the user to see what is typical or what generally happened over time within a project based on the manner in which the devices within the project moved through the various different device states and the manner in which the devices within the project moved through the various different health states during the course of the project. This information also allows users to analyze current or future projects based on the statistical data of a completed project to see if the current project is on track, to predict the time it will take to complete a future project, etc. Still further, the asset management applications 192, 194 creating the interface 600 may provide, via the interface screen 600, one or more navigation controls to enable the user to review different time periods associated with a project and to take other actions such as to obtain further information about devices within any of the device states, sub-states, or heath states illustrated in FIG. 6.

It should be noted, however, that the statistical information illustrated in FIG. 6 is related only to the devices in a particular project, and the asset management applications can determine, calculate and provide the information depicted in the screen 600 by accessing the device data 193 (e.g., device state and sub-state data and heath data) for only devices marked in the asset management database 184 as being associated with the project (either via project parameter data 193a for each of the devices or via a project data file 196 specifying a list of devices for the project, as stored in the database 184). Thus, for example, the asset management application 192, 194 creating the interfaces, such as that of FIG. 6, can scroll through the device list of a project as stored in the database 184 and select or retrieve device data (from the asset management database 184) only for the devices associated with a particular project or within a project device list. In another example, the asset management application 192, 194 creating the interfaces, such as that of FIG. 6, can scroll through the device parameters of each device file 193 in the asset management database 184 and select or retrieve device data (from the asset management database 184) only for the devices having a project parameter 193a associated therewith that indicates that the device is within a particular project or within a project device list of a particular project.

Figure 7:
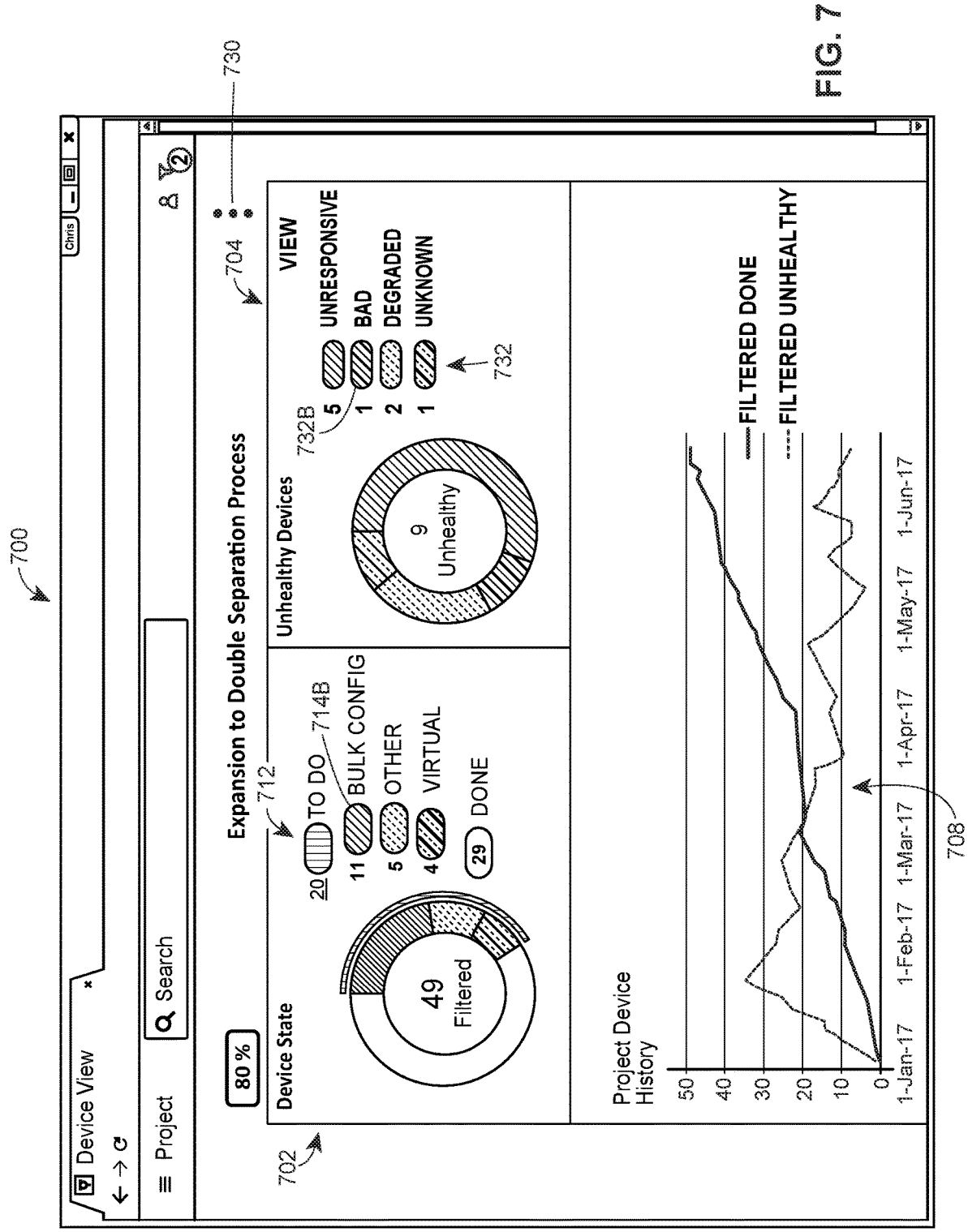
FIG. 7 illustrates an example user interface that may be produced by an asset management system to depict current and historical statistical information regarding device states and device health information for a filtered or subset of the assets within a particular project.

Still further, the asset management applications 192, 194 may enable a user to filter on the devices within a project to obtain statistical information about a filtered list or subset of devices within the project. Thus, for example, the device viewing application 194 may enable a user to select filtered criteria (not shown) to filter devices within a project based on, for example, device type, device status, device parameter information, device manufacturer, or other types of filtering criteria. FIG. 7 illustrates a screen 700 that may be produced by the application 194 (for example) that is similar to the screen 600 but that provides statistical data about a filtered set of devices within the project illustrated in FIG. 6. In this case, for example, the devices may be filtered on device type and the screen 700 may illustrate statistical information about the devices within the project that have the valve device type. Because of the filtering performed by the application 194 (for example), the screen section 702 only includes 49 devices, which are indicated as being a filtered list to inform the user that this set of devices is not a complete list of devices within the project. In any event, the screen section 702 provides or displays the device state information regarding the 49 devices within the filtered list. Still further, the screen section 704 of the screen 700 provides heath state data for the 49 filtered devices indicating the number of those devices in each of the four health categories via a circle graphic and a set of icons 732. Likewise, the graph 708 of the screen 700 may provide historical statistical information about the device states and health states of the 49 devices over a selected time period.

Figure 8:
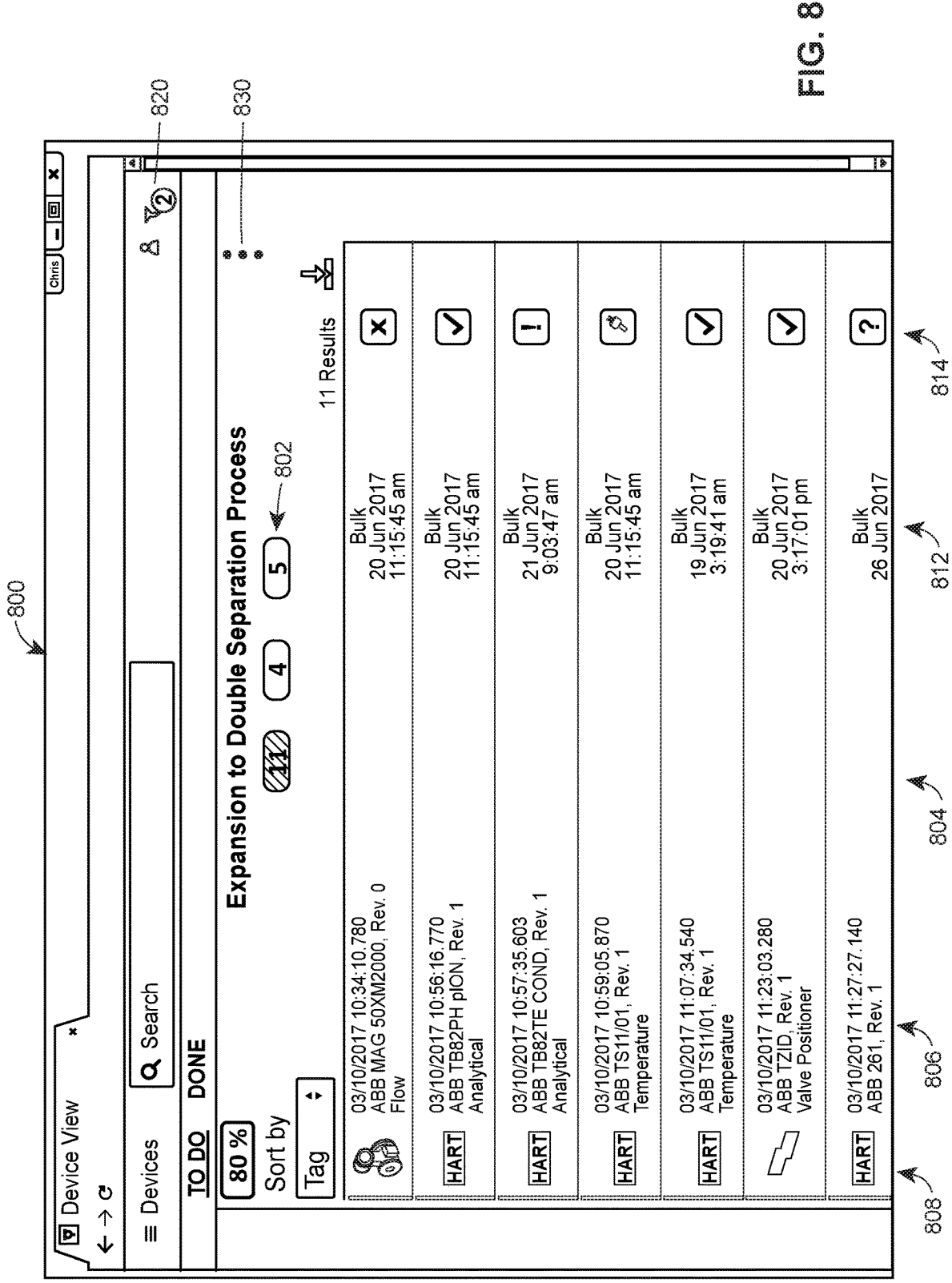
FIG. 8 illustrates an example user interface that may be produced by an asset management system to depict additional information regarding the assets within one of the device sub-states of FIG. 7.

If desired, the asset management applications 192, 194 may enable a user to easily obtain or view additional information regarding specific devices within the project in other manners. For example, selecting the bulk configuration icon 714B in FIG. 7 may cause the asset management application 194 to present the screen 800 of FIG. 8, which illustrates additional information about devices in the different sub-states of the To Do device state. The devices associated with the device sub-states are illustrated in summary form as icons or tabs 802 at the top of the screen 800, with the devices illustrated in a screen section 804 of the screen 800 being the devices associated with the highlighted or selected tab(s) 802. In the example of FIG. 8, the screen section 804 lists 11 actual devices and device information about the devices that fall within the Bulk Configuration sub-state of the To-Do device state of the filtered group of 49 devices of the project illustrated in FIG. 7. The screen section 804 provides additional information about particular devices within the selected tabs 802, such as a tag name 806, an icon 808 associated with or indicating a device manufacturer or device type, status information about the device 812, including dates in which particular activities or devices states or sub-states were achieved, and health information 814 about the device. Health information in this example is illustrated using icons, with a different icon being associated with each of the different health states (e.g., Unresponsive, Bad, Degraded, Unknown, or Good). In this manner, the application 194 can provide and a user can view specific device information about particular devices within the statistical categories illustrated in the earlier screens of FIGS. 6 and 7, for example.

Figure 9:
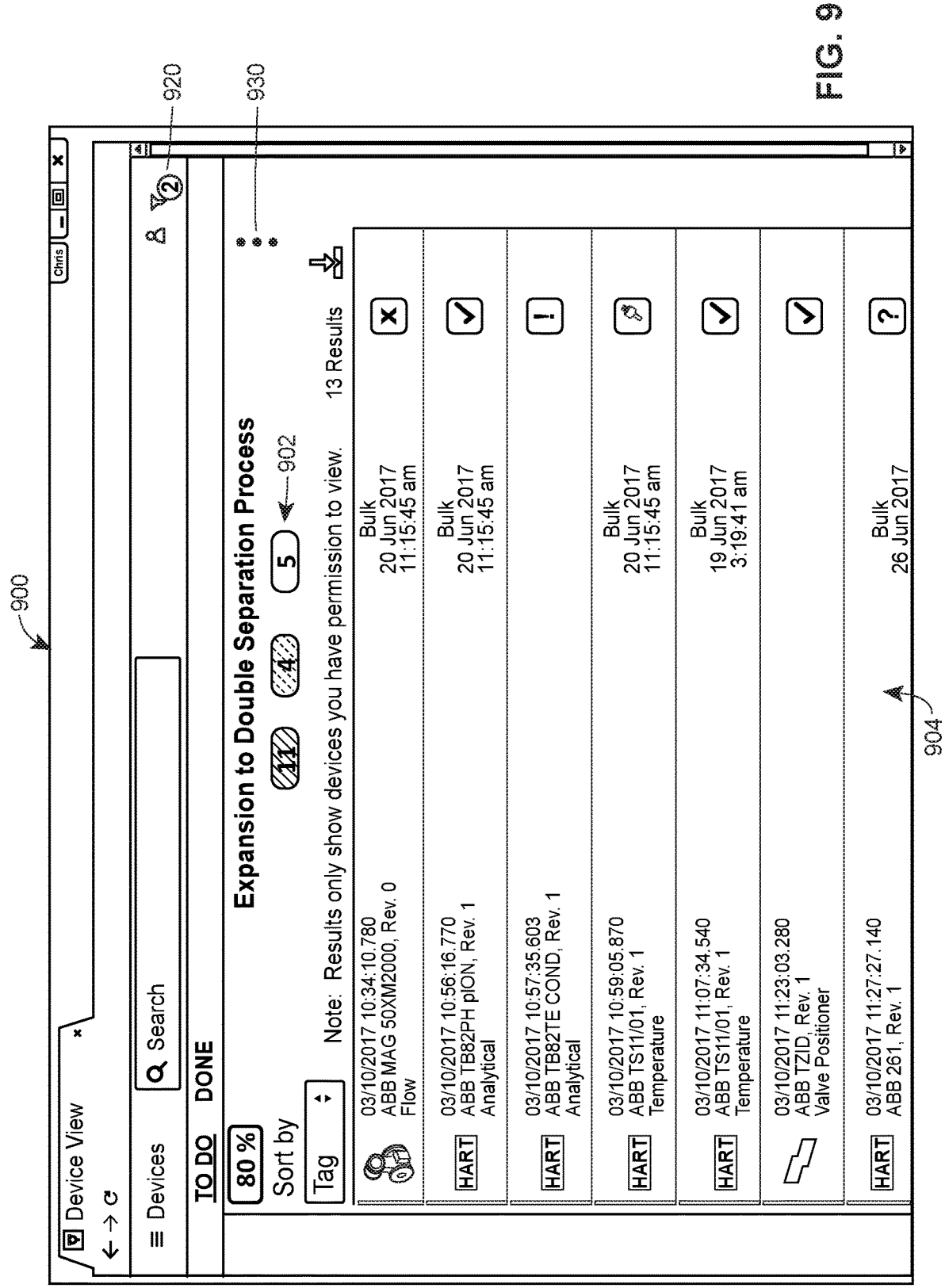
FIG. 9 illustrates an example user interface that may be produced by an asset management system to depict additional information regarding the assets within two of the device sub-states of FIG. 7.

As a further example, a user may, if desired, select a further tab 802 in FIG. 8, such as the middle tab, to view information about the devices associated with that tab (or device sub-state). A further screen 900 is illustrated in FIG. 9 which may be produced by the application 194 upon selection of the middle tab 802 of FIG. 8 (also shown as tab 902 of FIG. 9), and the screen 900 includes device information about devices in both of the Bulk Configuration sub-state (11 devices) and the Virtual sub-state (4 devices). Thus, the screen 900 of FIG. 9 includes a list of bulk configured devices and virtual devices in the filtered list of FIG. 7, but does not include devices in the Other sub-state of the To Do configuration state of the 49 filtered devices within the project. Of course, some of the devices that fall within these sub-states could be hidden from view or not provided to the user in the screen section 804 or 904 based the permissions (security level) of the particular user viewing the information. Thus, if a user does not have permission to view the state or status information of a particular device within one of the statistical categories selected, the user would not be shown that device information. Still further, the filter icons 820 and 920 in the top of the screens 800 and 900 of FIGS. 8 and 9 may be used to indicate to the user that the user is viewing a filtered list of devices, as opposed to a list of all of the devices within the project. Likewise, a tab 830 and 930 in the screens 800 and 900 may be used to run a report, such as a commissioning report, to delete device tags from or to add device tags to a project, or to otherwise change project definitions or information. Still further, the information in the screens of FIGS. 8 and 9 may be sorted by the user (e.g., by tag, device type, device state, health state) and the screens 800 and 900 may provide the user with additional information upon hover or click events (e.g., a heath state name when the user hovers over a health state icon in the column 814).

Figure 10:
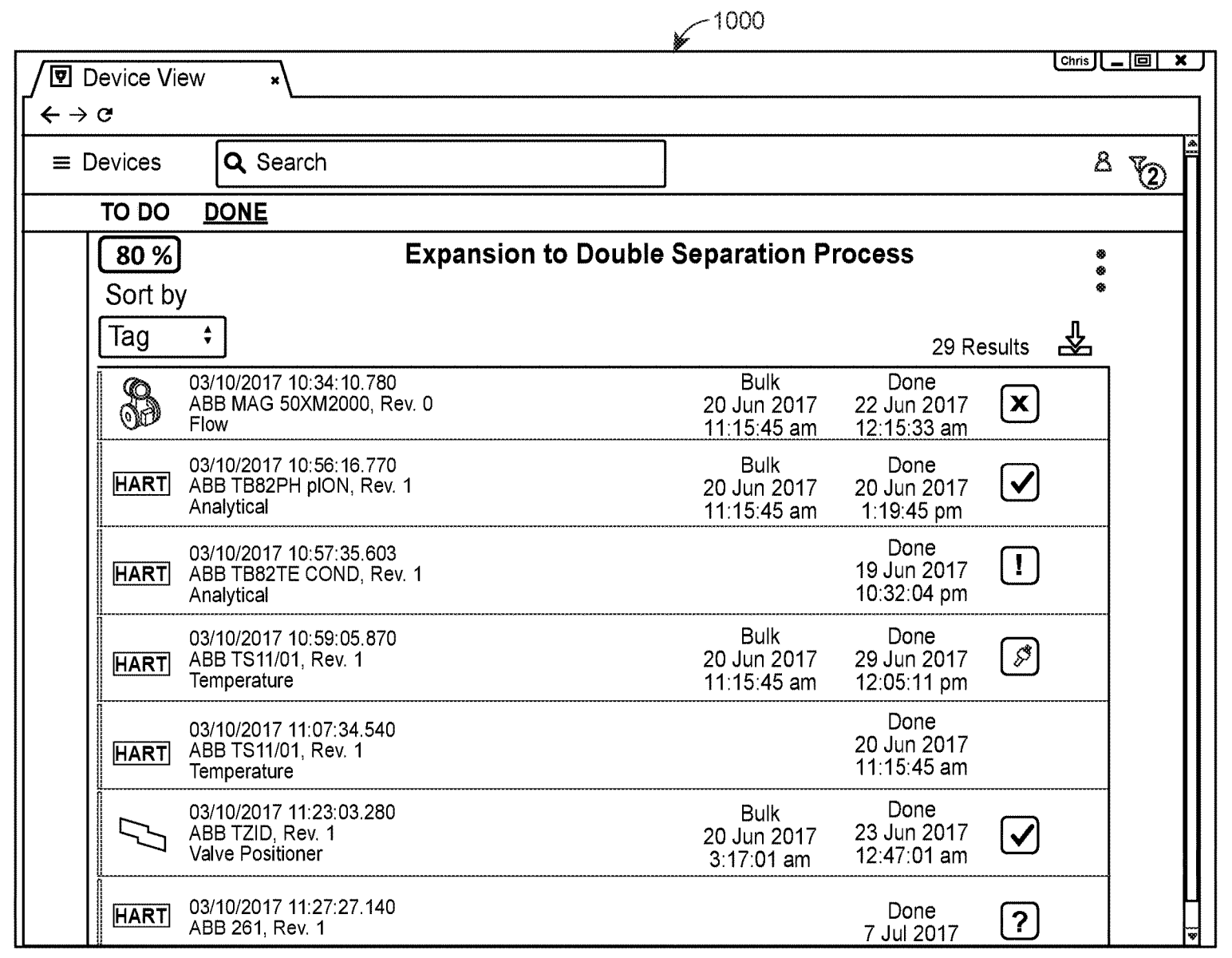
Figure 11:
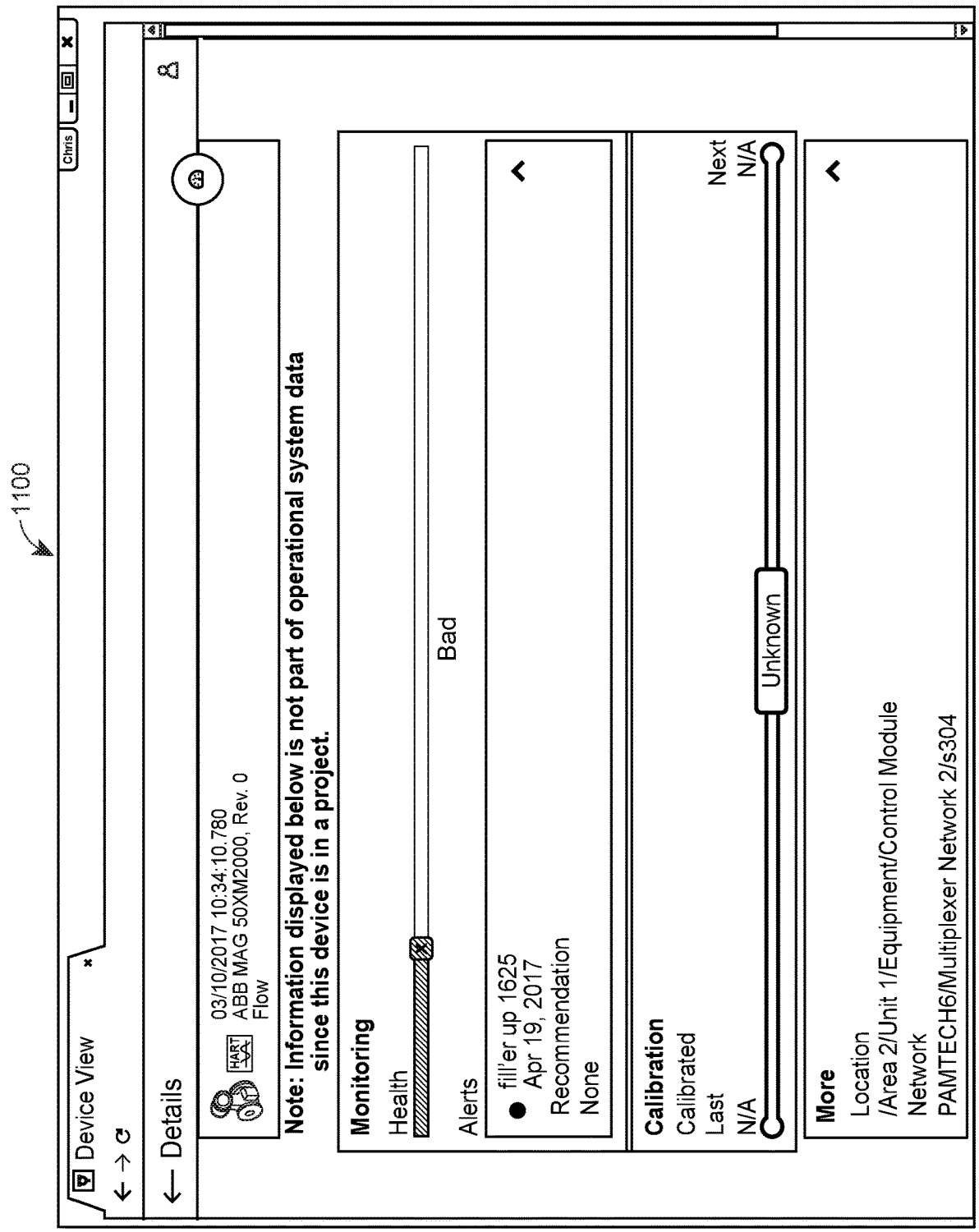
FIG. 11 illustrates an example user interface that may be produced by an asset management system to depict additional information regarding a particular asset within the screen of FIG. 10.

As another example, FIG. 10 illustrates a user interface screen 1000 that may be produced by the asset management application 192, 194 used to provide the user with device information regarding the 29 devices within the Done device state (as illustrated in FIG. 7). In particular, the user may select between viewing device information for devices in the To Do and in the Done device states using the links 1002 in FIG. 10 (or similar links in FIGS. 8 and 9). In the example screen 1000 of FIG. 10, the listed device information includes information about the 29 devices in the Done device state of FIG. 7, limited by the user's permissions. Of course, the asset management system or application 192, 194 could provide and the user could view device information about particular devices either filtered or unfiltered within a project in any other desired manner. Likewise, the user may obtain still further information regarding a particular device by selecting a device name or row in one of the screens of FIG. 8-10. Such an example screen 1100 is illustrated in FIG. 11, in which the top device in FIG. 10 has been selected to obtain more information regarding the specifics of that device, including health information, alerts associated with the device, calibration information about the device, location of device, the network to which the device connected, a communication path, etc. The detail screen of FIG. 11 illustrates live device information for a project device, and a message may be provided to the user to indicate that the device information is about a device in a project and is not associated with a run-time device.

Figure 12:
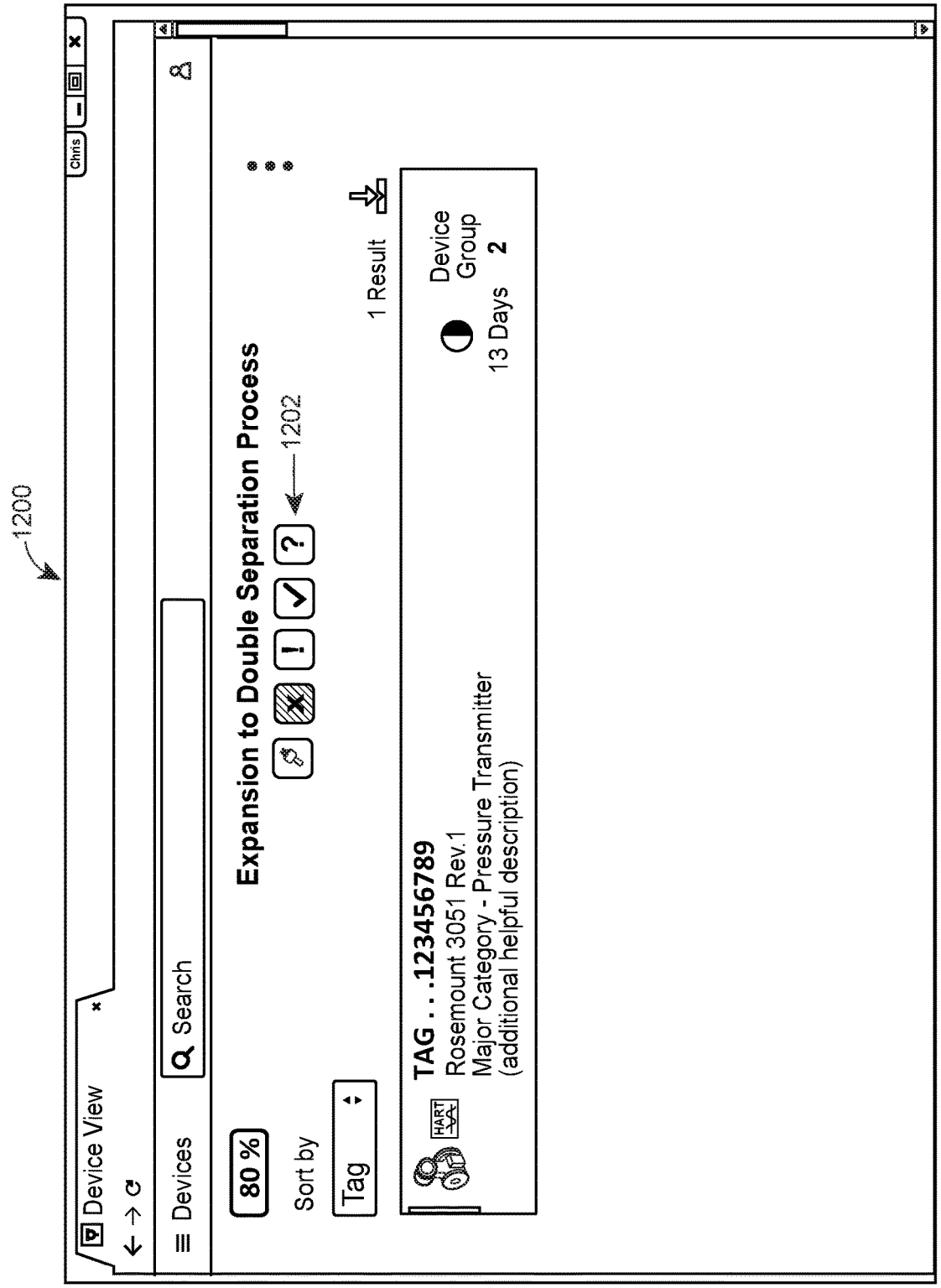
FIG. 12 illustrates an example user interface that may be produced by an asset management system to depict additional information regarding one or more assets within one of the health categories depicted in the screen of FIG. 7.

Still further, in another situation, the user may be presented with particular health information about devices based on health status of the device. Thus, for example, the user may select, in one of the screens of FIGS. 6-10, such as in the screen of FIG. 7, the Bad health status icon 732B to obtain a list of all the project devices (which may be a filtered list) falling into the Bad health status. As illustrated in the screen 1200 of FIG. 12, any of the heath state or status icons 1202 can be selected or deselected to add or delete the devices that are presented in the device list of FIG. 12. In the case of FIG. 12, only one device is illustrated because only the Bad health status icon 1202 has been selected, and there is only one device in the Bad health status in the filtered set of devices associated with the information within FIG. 7. Of course, any desired device information may be provided about the devices within any of these categories to enable a user to view particular information about devices within a project based on health status.

Of course, similar screens could be provided for other devices in any of the projects, such as any of the projects listed in FIG. 4. Moreover, the information, in particular the historical information, about the statuses of different devices on different days or times during a particular project may be stored for a completed project and may be viewed by selecting a completed project, such as by selecting the completed project at the bottom of the screen 400 of FIG. 4. In that case, live device information would not be provided about devices in the project because the project is completed and the devices have been returned to the run-time state (e.g., by changing one or more project device parameters 193*a* for the devices in the asset management database 184). However, historical information, and in particular historical statistical information, about the number of devices in each device state and health state over time (as well as other device information) can be stored and provided to a user to enable the user to view what had occurred with respect to different device states and health states within the project during the life of the project. Of course, the screen displays of FIGS. 4-12 are merely example screen displays, and data including device state data, health state data, data for projects, particular device data, as well as other raw and statistical device information could be illustrated, displayed, or provided to a user in any other form or manner based on the project definitions as described herein.

Still further, a user may also, within a project, prepare or obtain a report about the status of the project, including any pertinent information about the status of project such as device states and health states. For example, during a commissioning project, a user may ask for and the asset management applications 192, 194 may produce a commissioning report including device statistics and device states, health states, pertaining only to devices in the project. Because the report is limited to the devices in a project, this report is much easier to use to make decisions about how to, for example, best complete the project, actions that need to be performed to complete the project, etc. Of course, the specific device information provided in the report may vary depending on the type of report, such as if it is a commissioning report or a maintenance report. An example of a commissioning report is illustrated in FIG. 13, in which various different commissioning information about devices within a project is provided to a user, all in a comprehensive but easy-to-read format. In the example of FIG. 13, the report lists of set of devices or device tags associated with the project (in this case a commissioning project), a status (which might be a summary or abbreviated version of the device status or state of each device as illustrated in FIG. 6), a user configuration field that indicates the user configuration applied to the device for commissioning the device, a user configuration applied field that indicates if the user configuration for a device was successful, failed or had some other outcome or state, an application date field indicating when the user configuration was applied or attempted, and an issues field indicating information about the configuration application, such as a reason for a failure, etc. Of course, all of the information in the report of FIG. 13 could be stored as values for device parameters in the device files 193 of the asset database 184 or other database. Moreover, the configuration or commissioning report of FIG. 13 could include other or different information, and other types of reports could be generated automatically by the device viewing application 194 or the device manager application 192.

The techniques, systems, apparatuses, components, devices, and methods described herein may apply to industrial process control systems, environments, and/or plants, which are interchangeably referred to herein as "industrial control," "process control," or "process" systems, environments, and/or plants. Typically, such systems and plants provide control, in a distributed manner, of one or more processes that operate to manufacture, refine, transform, generate, or produce physical materials or products.

The following additional considerations apply to the foregoing discussion. Throughout this specification, actions described as performed by any device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a computer readable medium (i.e., on a memory device). The instructions, when executed by one or more processors of a corresponding device (e.g., an operator workstation, a commissioning tool, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Further, while the terms "operator," "personnel," "person," "user," "technician," "administrator," and other like terms are used to describe persons in the process plant environment that may use or interact with the systems, apparatus, and methods described herein, these terms are not intended to be limiting. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and are described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "causing to be presented," "causing to be displayed," "displaying," or the like may refer to actions or processes of a machine (e.g., a computer) that manipulates or transforms data represented as physical (e.g., electronic, magnetic, biological, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, a solid state memory device, a molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed is:

1. A computer-implemented method of tracking device information for devices within a plant environment having a multiplicity of plant assets, the method comprising:
    obtaining, by each of the set of plant assets associated with respective computer readable memories and processors, device state data for each respective plant asset, wherein the plant assets are physical devices that perform physical control functions within a process plant;
    storing, by the computer readable memory associated with each plant asset, the obtained device state data for each respective plant asset;
    storing, by a computing device, within a database a set of project data for each of a plurality of commissioning projects, each set of project data including a list of which plant assets are associated with each of the plurality of commissioning projects within the plant, wherein the commissioning projects include one or more of bringing the plant assets off-line or bringing the plant assets on-line;
    accessing, by the computing device, via a communication link, the device state data as stored in the computer readable memory of each of the plant assets within a particular commissioning project;
    monitoring, by the computing device, one or more project metrics, and one or more device conditions of interest in real-time, based on accessing device state data for the each of the plant assets within the particular commissioning project without accessing device state data for plant assets not within the particular commissioning project; and
    presenting, by the computing device, the one or more project metrics and the one or more device conditions of interest via a user interface device in real-time.

2. The computer-implemented method of claim 1, wherein determining one or more project metrics includes the determining a completion percent of the project based on the device state data for the plant assets within the particular project.

3. The computer-implemented method of claim 1, wherein determining one or more project metrics includes determining statistical information regarding a number of plant assets in each of a set of different device states associated with the particular project.

4. The computer-implemented method of claim 3, wherein determining the statistical information regarding a number of plant assets in each of a set of different device states associated with the particular project includes determining the number of the plant assets within the particular project as being in either a complete device state or in a non-complete device state with respect to the particular project.

5. The computer-implemented method of claim 3, wherein determining the statistical information regarding a number of plant assets in each of a set of different device states associated with the particular project includes determining the number of the plant assets within the particular project as being in one of three or more device states with respect to the particular project.

6. The computer-implemented method of claim 3, wherein determining the statistical information regarding a number of plant assets in each of a set of different device states associated with the particular project includes determining the number of the plant assets within the particular project as being in one of at least two device states with respect to the particular project and further including determining the number of plant assets within one of the at least two device states as being within one of two or more different device sub-states associated with the one of the at least two device states.

7. The computer-implemented method of claim 3, wherein determining one or more project metrics further includes determining statistical information regarding a number of plant assets in each of a set of different health states.

8. The computer-implemented method of claim 3, wherein determining one or more project metrics further includes determining statistical information regarding how many of the plant assets that are in one of the devices states are within different ones of a set of two or more health states.

9. The computer-implemented method of claim 3, further including storing, within a database, plant asset information regarding one or more plant asset states over different times of the project and including presenting, to the user via the user interface, historical information related to the plant asset states over a time period associated with the project.

10. The computer-implemented method of claim 9, wherein the one or more plant asset states includes one or both of a device state and a health state for each of the plant assets.

11. The computer-implemented method of claim 3, further including enabling a user via the user interface, to view device specific information related to a plant asset in one of the device states.

12. The computer-implemented method of claim 1, wherein determining one or more project metrics includes determining statistical information regarding a number of plant assets in each of a set of different health states.

13. The computer-implemented method of claim 12, further including enabling a user via the user interface, to view device specific information related to a plant asset in one of the health states.

14. The computer-implemented method of claim 1, further including enabling a user via the user interface, to select a filter criteria for the set of plant assets within the particular project to produce a filtered list of plant assets and wherein determining the one or more project metrics includes using the accessed device data for the plant assets for the filtered list of plant assets, and wherein presenting the one or more project metrics to a user via a user interface device includes presenting the project metrics for the filtered list of plant assets.

15. The computer-implemented method of claim 1, further including producing, via a computer processing device, a report from the stored plant asset data for the plant assets associated with a particular project defining the state of the project.

16. An asset management system for use in a process plant for accessing data associated with a set of devices within the process plant, comprising:
a set of devices that perform physical functions within a process plant, each device associated with a processor and a computer readable memory storing a set of device data for each of the set of devices;
a computing device including:
a user interface for presenting content;
a memory;
one or more processors interfacing with the set of devices, the user interface, and the memory, and configured to:
receive, via a communication link from each of the set of devices, device data for each respective device,
store the device data associated with the set of devices in the memory,
receive, via the user interface, a project definition of a commissioning project within the process plant, the project definition including a list of which devices associated with each of the one or more commissioning projects within the plant, wherein the commissioning projects include one or more of bringing the devices off-line or bringing the devices on-line;
store the project definition within the memory;
monitor one or more project metrics, and one or more device conditions of interest in real-time, based on accessing device data for the devices within the commissioning project without accessing device data for devices not within the commissioning project; and
present the one or more project metrics and the one or more device conditions of interest via the user interface.

17. The asset management system of claim 16, wherein the device data including device state data and the one or more processors determines one or more project metrics by determining a completion percent of the project based on the device state data for the devices within the project.

18. The asset management system of claim 16, wherein the one or more processors determines one or more project metrics by determining statistical information regarding a number of devices in each of a set of different device states associated with the project.

19. The asset management system of claim 18, wherein the one or more processors determines the statistical information regarding a number of devices in each of a set of different device states associated with the project by determining the number of the plant assets within the project as being in either a complete device state or in a non-complete device state with respect to the project.

20. The asset management system of claim 18, wherein the one or more processors further determines the statistical information regarding a number of devices in each of a set of different device states associated with the project by determining the number of the devices within the project as being in one of at least two device states with respect to the project and further includes determining the number of devices within one of the at least two device states as being within one of two or more different device sub-states associated with the one of the at least two device states.

21. The asset management system of claim 18, wherein the one or more processors determines one or more project metrics by determining statistical information regarding a number of devices in each of a set of different health states.

22. The asset management system of claim 18, wherein the one or more processors determines one or more project metrics by determining statistical information regarding how many of the devices in one of the devices states are in different ones of a set of two or more health states.

23. The asset management system of claim 18, wherein the one or more processors store, within a database, device information regarding one or more devices within the project over different times of the project and present, to a user via the user interface, historical information related to the devices within the project over a time period associated with the project.

24. The asset management system of claim 18, wherein the one or more processors enable a user, via the user interface, to select a filter criteria for the set of devices within the project to produce a filtered list of project devices and wherein the one or more processors determine the one or more project metrics using the accessed device data for the project devices within the filtered list of project devices, and wherein the one more processors present the one more or project metrics to a user via a user interface device by presenting the project metrics for the filtered list of project devices.

* * * * *